United States Patent
Chen et al.

(10) Patent No.: US 12,548,273 B2
(45) Date of Patent: Feb. 10, 2026

(54) VISUAL EFFECTS AND CONTENT ENHANCEMENTS FOR VR

(71) Applicant: Adeia Guides Inc., San Jose, CA (US)

(72) Inventors: Tao Chen, Palo Alto, CA (US); Charles Dasher, Lawrenceville, GA (US); Reda Harb, Issaquah, WA (US)

(73) Assignee: Adeia Guides Inc., San Jose, CA (US)

(*) Notice: Subject to any disclaimer, the term of this patent is extended or adjusted under 35 U.S.C. 154(b) by 470 days.

(21) Appl. No.: 17/975,057

(22) Filed: Oct. 27, 2022

(65) Prior Publication Data

US 2024/0144621 A1 May 2, 2024

(51) Int. Cl.
| | |
|---|---|
| *G06T 19/20* | (2011.01) |
| *G06T 7/50* | (2017.01) |
| *G06T 7/70* | (2017.01) |
| *H04N 23/67* | (2023.01) |

(52) U.S. Cl.
CPC .............. *G06T 19/20* (2013.01); *G06T 7/50* (2017.01); *G06T 7/70* (2017.01); *H04N 23/67* (2023.01); *G06T 2219/2016* (2013.01)

(58) Field of Classification Search
CPC .. G06T 19/20; G06T 7/50; G06T 7/70; G06T 2219/2016
See application file for complete search history.

(56) References Cited

U.S. PATENT DOCUMENTS

| | | | |
|---|---|---|---|
| 9,092,908 B2 | 7/2015 | Rapoport et al. | |
| 9,118,978 B2 | 8/2015 | Macrae et al. | |
| 2010/0002122 A1* | 1/2010 | Larson | H04N 23/632 348/E5.022 |
| 2014/0015827 A1* | 1/2014 | Rapoport | G06T 19/003 345/419 |
| 2014/0300775 A1* | 10/2014 | Fan | H04N 23/95 348/222.1 |
| 2016/0217616 A1 | 7/2016 | Kraver | |
| 2018/0025235 A1* | 1/2018 | Fridman | H04N 23/90 382/103 |
| 2019/0019303 A1 | 1/2019 | Siver et al. | |
| 2019/0026956 A1 | 1/2019 | Gausebeck et al. | |
| 2019/0080498 A1 | 3/2019 | Horie et al. | |
| 2020/0218690 A1* | 7/2020 | Huston | G06T 19/006 |
| 2020/0264695 A1* | 8/2020 | Sanjoto | G06F 3/00 |
| 2021/0042950 A1 | 2/2021 | Wantland et al. | |
| 2022/0091665 A1* | 3/2022 | Mccombe | H04N 13/117 |

(Continued)

OTHER PUBLICATIONS

Chen, Si, "Rise of the Indoor Crowd: Reconstruction of Building Interior View via Mobile Crowdsourcing" "In Proceedings of the 13th ACM Conference on Embedded Networked Sensor Systems", 2015, Association for Computing Machinery, pp. 59-71. (Year: 2015).*

(Continued)

*Primary Examiner* — Terrell M Robinson
(74) *Attorney, Agent, or Firm* — HG LAW LLP

(57) ABSTRACT

Systems and methods are provided for creating enhanced VR content. The system generates, for display on a user device, a view of a virtual 3D environment. The system detects that a location in the view of virtual 3D environment matches one or more criteria. In response to the detecting that the location in the virtual 3D environment matches the one or more criteria, the system automatically stores an image of the virtual 3D environment.

20 Claims, 15 Drawing Sheets

(56) References Cited

U.S. PATENT DOCUMENTS

2024/0144620 A1   5/2024   Chen et al.

OTHER PUBLICATIONS

Wright et al.; "How to tell the difference between a model and a digital twin;" Advanced Modeling and Simulation in Engineering Sciences (2020); 7:13; Springer Open; 13 pages (Year: 2020).
"Add the Ken Burns effect in iMovie on Mac—Apple Support", https://support.apple.com/guide/imovie/add-the-ken-burns-effect-movc6e02f503/mac, retrieved on Jan. 5, 2023.
"How do I create a 3D photo on Facebook?", Facebook Help Center: https://www.facebook.com/help/414295416095269, retrieved on Jan. 5, 2023.
"How to apply a Ken Burns effect | Adobe Premiere Pro Tutorials", https://helpx.adobe.com/premiere-pro/how-to/ken-burns-effect.html, retrieved in Jan. 5, 2023.
Cun, X., et al., "Depth-Assisted Full Resolution Network for Single Image-Based View Synthesis", https://arxiv.org/abs/1711.06620, Nov. 17, 2017.
Niklaus, S., et al., "3D Ken Burns Effect from a Single Image", ACM Transactions on Graphics, vol. 38, No. 6, Nov. 2019, 1-15.

\* cited by examiner

150

152 — VR View

154 — Image with Flash

VR virtual camera photo before flash processing

VR virtual camera photo after remote rendering of flash

VISUAL EFFECTS AND CONTENT ENHANCEMENTS FOR VR

BACKGROUND

The present disclosure relates to virtual reality and, in particular, to systems and related processes for creating enhanced virtual reality content.

SUMMARY

The metaverse is an emerging area of entertainment where users interact with each other and virtual objects within a virtual reality (VR) environment. Users may enjoy capturing images (e.g., screenshots, photos, videos, and video clips) in a virtual environment (e.g., from within a VR experience). However, users may desire images with higher resolution than those images captured from VR headsets and rendering devices which may have lower resolution (e.g., low polygon count) renderings to achieve high frame rate (in particular, for devices not attached via a data cable to an external computing device such as a PC). Users may want images of higher quality than is currently available when creating the virtual images using the VR engine of existing VR headsets.

In one approach, captured images may be converted to 3D images (photos) by manually estimating or using artificial intelligence to estimate depth information from captured 2D images. This approach has problems such as with disocclusions which make synthesis of new views and generation of texture difficult. In one approach, a single photo (or using multiple cameras and data from depth sensors on mobile phones) may be used to create 3D effects. This approach has problems such as creating a plausible 3D experience in adding effects (e.g., Ken Burns effects) to photos for the generated 3D images may include visual artifacts, less faithful representation, distortions, unnatural synthesis results (e.g., different parts of an object being torn apart), occluded background points erroneously becoming visible in the process of rendering novel views or completing a point cloud representation, etc. In one approach, 3D effects may include changing viewpoint perspective of an individual object. This approach has problems such as occlusions which remain invariant to those viewports (e.g., occlusion or occluded object remains occluded even when changing views).

In one approach, users may store or share virtual photos or videos on their real device by manually taking screenshots or videos on a VR headset and manually transferring images to a camera roll on their phone. This approach has problems such as with creating more realistic images than ones rendered in a VR environment. For example, due to the desire to limit visual effects or elements which may make users dizzy or create eye strain, effects such as blurring or focus pull effects may not be present within a VR experience, and a lack of these effects removes a degree of realism from images captured from a VR experience. As another example, virtual photos manually captured on a VR device and manually transferred to a real device may lack metadata that corresponds to the virtual location within the metaverse or VR environment.

To help address these problems, systems and methods are described herein to enable creation of an enhanced image (e.g., 2D or 3D images, photos, videos) of a view of a VR environment.

Methods and systems are provided herein to solve the problem of generating 3D photos with a plausible 3D experience in adding effects (e.g., Ken Burns effects, one that removes occlusions when changing view, etc.), and generating a more realistic image than one rendered in a VR environment. In some embodiments, a computer system (e.g., using a VR application) generates, for display on a user device, a view of a virtual 3D environment. The system may receive, from the user device, a request to capture the view of the virtual 3D environment. The system may access data used to generate the view of the virtual 3D environment for display on the user device. The system may access additional data of the virtual 3D environment other than the data used to generate the view of the virtual 3D environment for display on the user device. The system may generate an image based on (a) the data used to generate the view of the virtual 3D environment for display on the user device, and (b) the additional data of the virtual 3D environment. The image may be generated for display on the user device and/or for display on another device (e.g., not the device requesting capturing the view). The user device, a server, cloud, and/or any combination thereof may generate the image. This solves the problem of generating 3D photos with a plausible 3D experience in adding effects, and the problem of generating a more realistic image than one rendered in a VR environment by using additional data of the virtual 3D environment to enhance an image.

In some embodiments, the additional data includes depth data for the view of the virtual 3D environment. The image may be an interactive image configured to display different view angles of the virtual 3D environment based on user interface input from the user device. The user interface input may include one or more of tilting, rotating, or scrolling. In some embodiments, the image includes at least a portion of an object of the 3D environment that is not included in the view of the virtual 3D environment. In some embodiments, the image represents the view of the virtual 3D environment captured at a different time than a time the request was received.

In some embodiments, the image represents the view of the virtual 3D environment including an application of a filter not shown in the view of the virtual 3D environment. The application of the filter may include one or more of: adding or removing a virtual flash, removing or adding a lens flare, or changing a focal length or aperture of a virtual camera. In some embodiments, at least a portion of the image is represented at a higher resolution than a corresponding portion of the view of the virtual 3D environment.

In some embodiments, the system generates one or more additional images based on the additional data of the virtual 3D environment. The image and the one or more additional images may represent a series of images corresponding to the view of the virtual 3D environment. In some embodiments, the system may create an album including the image and the one or more additional images. The album may be created to include the image and/or the one or more additional images. In some embodiments, the image is added to an existing album. In some embodiments, the image may be added to an album according to the type of image and the type of album. For example, the image may be a selfie image and may be added to a selfie album. In some embodiments, different VR environments may be associated with different VR albums, and the image may be added to a particular VR album according to the image being taken in a particular VR environment. In some embodiments, the system adds the image to a social feed for a user ID associated with the user device. In some embodiments, the system generates, for display on the user device, a recommendation to suggest a positioning of an avatar associated with a user ID associated with the user device in the virtual 3D environment for capturing a popular image of the avatar in the virtual 3D environment for a virtual selfie. The avatar may be a photorealistic rendering of a user associated with the user device.

In some embodiments, the system generates one or more additional images based on the additional data of the virtual 3D environment, wherein the image represents the view of the virtual 3D environment captured at a same time that the time the request was received, and the one or more additional images represents the view of the virtual 3D environment captured at one or more different times than the time the request was received, and the image and the one or more additional images represents a virtual live photo.

In one approach a user needs to manually initiate taking photos of a view of VR environment. This is a problem because a user may miss important locations, etc. that the user would like to take a photo in. If a user misses a photo, the user may go back to the location to take the photo, or the user may take too many photos, which needlessly consume computational and memory resources.

To help address these problems, systems and methods are described herein to enable automatically capturing (storing) of a view of a VR environment.

Methods and systems are provided herein to solve the problem of a user missing taking photos at important locations or the user taking too many photos which consumes computational and memory resources. In some embodiments, the system generates, for display on a user device, a view of a virtual 3D environment. The system may detect that a location in the view of virtual 3D environment matches one or more criteria. The system may, in response to the detecting that the location in the virtual 3D environment matches the one or more criteria, automatically store an image of the virtual 3D environment. This solves the problem of a user missing taking photos at important locations or the problem of the user taking too many photos consuming computational and memory resources by automatically storing an image of the virtual 3D environment responsive to detecting that the location in the virtual 3D environment matches the one or more criteria.

In some embodiments, the system may access data used to generate the view of the virtual 3D environment for display on the user device, and generate the image based on the data used to generate the view of the virtual 3D environment for display on the user device. For example, in response to the detecting that the location in the virtual 3D environment matches the one or more criteria, the system may automatically store an image representing the view of the virtual 3D environment for display on the user device. In some embodiments, the system may access additional data of the virtual 3D environment other than the data used to generate the view of the virtual 3D environment to give a user the option to modify the image (e.g., the automatically stored image representing the view of the virtual 3D environment for display on the user device).

In some embodiments, the system may access data used to generate the view of the virtual 3D environment for display on the user device, and the system may access additional data of the virtual 3D environment other than the data used to generate the view of the virtual 3D environment for display on the user device. The system may generate the image based on (a) the data used to generate the view of the virtual 3D environment for display on the user device, and (b) the additional data of the virtual 3D environment. For example, in response to the detecting that the location in the virtual 3D environment matches the one or more criteria, the system may automatically store an enhanced image of a view of a VR environment.

In some embodiments, detecting that the location in the virtual 3D environment matches the one or more criteria comprises determining that a number of images captured by other user IDs at the location in the virtual 3D environment exceeds a threshold number. In some embodiments, detecting that the location in the virtual 3D environment matches the one or more criteria comprises determining that a number of images captured by other device IDs at the location in the virtual 3D environment exceeds a threshold number. The number of images captured by other user IDs and/or device IDs may be a sum of the images captured by other user IDs and/or device IDs. In some embodiments, the number of images captured by other user IDs and/or device IDs may be a weighted sum of the images captured by other user IDs and/or device IDs. For example, a user may be associated with multiple devices (e.g., device IDs) and/or with different user IDs, and instead of counting each image captured by different device ID and/or user IDs associated with the same user, the system may weight the number of images captured by the device IDs and/or user IDs by a same user (e.g., weighting may be less than one) for use in a weighted sum of the images captured by other device IDs and/or user IDs.

In some embodiments, detecting that the location in the virtual 3D environment matches the one or more criteria comprises determining that the location represents a pathway to or a popular object included in a new environment for a user ID associated with the user device. In some embodiments, detecting that the location in the virtual 3D environment matches the one or more criteria comprises: determining that a user preference indicates to automatically capture an image in a location where one or more friends captured one or more images, and determining that the one or more friends captured the one or more images at the location in the virtual 3D environment.

In some embodiments, the detecting that the location in the virtual 3D environment matches the one or more criteria comprises determining that a number of captured images including an object present in the location by other user IDs in the virtual 3D environment exceeds a threshold number. In some embodiments, the detecting that the location in the virtual 3D environment matches the one or more criteria comprises determining that a number of captured images including an object present in the location by other device IDs in the virtual 3D environment exceeds a threshold number. The number of captured images by other user IDs and/or device IDs may be a sum of the captured images by other user IDs and/or device IDs. In some embodiments, the number of captured images by other user IDs and/or device IDs may be a weighted sum of the captured images by other user IDs and/or device IDs. For example, a user may be associated with multiple devices (e.g., device IDs) and/or with different user IDs, and instead of counting each captured image by different device ID and/or user IDs associated with the same user, the system may weight the number of captured images by the device IDs and/or user IDs by a same user (e.g., weighting may be less than one) for use in a weighted sum of the captured images by other device IDs and/or user IDs.

In some embodiments, the image is based on (a) the data used to generate the view of the virtual 3D environment for display on the user device, and (b) the additional data of the virtual 3D environment. In some embodiments, the additional data includes depth data for the view of the virtual 3D environment, and the image is an interactive image configured to display different view angles of the virtual 3D environment based on user interface input from the user device, wherein the user interface input comprises one or more of tilting, rotating, or scrolling. In some embodiments, the image represents the view of the virtual 3D environment including an application of a filter not shown in the view of the virtual 3D environment, wherein the application of the filter comprises one or more of: adding or removing a virtual flash, removing or adding a lens flare, or changing a focal length or aperture of a virtual camera. In some embodiments, the image includes an avatar associated with a user ID associated with the user device positioned in a popular pose in the virtual 3D environment.

In some embodiments, systems and methods are described herein to improve content creation of 3D photography. The systems and methods may enable capturing moments in VR and creating high quality 3D photos for e.g., social sharing. The systems and methods may enable creation of high-quality 3D photography with input from capturing moments in VR and stereo 360 video. The systems and methods may access visual data from VR and 360-degree video to generate high quality, realistic visual effects. The systems and methods may capture the moment of interest that a user would like to share and generated 3D photos may be posted for sharing on social media apps. The systems and methods may enable capturing moments in VR and creating high quality 3D photos for social sharing.

In some embodiments, systems and methods are described herein to, within a VR environment, use a virtual camera to "take" high resolution photos and videos based on low resolution or low complexity objects, to use external resources such as cloud rendering to encode, enhance or process the virtual photo or video adding virtual environment metadata such as virtual location, and to transfer the photo or video from the VR environment to a user's camera roll in a user's cloud storage device or directly to a user's real device. The systems and methods may use an external (cloud) or remote rendering/post processing to create higher quality videos and photos. The systems and methods may be used with a proprietary service such as Apple iCloud photos, and enable the creation of specialty photos and videos such as Apple Live Photo. The systems and methods may allow a VR headset to overcome limitations of the local rendering engine (e.g., quality of the local rendering engine).

In some embodiments, systems and methods may enable the creation of 3D images from images captured in a VR environment. The images captured from a VR environment may include metadata used by a user device (e.g., headset, head mounted display, HMD) to render immersive experience and create views. The captured images from the VR environment may be video or sequence of images. Temporal data from the video may be used to assist in filling in occluded detail. The system may use external or remote rendering and/or post processing to create higher quality videos and photos. The system may generate a series of 3D images from a VR moment. For example, a first 3D image may be the actual view rendered to user and displayed on the user device. At least a second 3D image may be generated to depict an unrendered view (e.g., additional visual data, or from different virtual cameras which can be used to create the 3D photography). A number of 3D images may be generated based on the availability of metadata in the capture image or series of frames. In another embodiment, a second image may be generated based on a popular or unexplored view.

In some embodiments, systems and methods may enable auto capture. A system may generate images based on user preferences and rules, and auto-capture rules. The auto-capture rules may be based on user settings and/or personalized. In some embodiments, a user may specify to automatically capture an image in popular locations where other users captured an image or where their friend captured an image. The user may specify that the system generate a 3D image of a view that matches those of their friends (e.g., view captured by friends). A system may automatically capture content upon a user entering a new environment or when user's friends are nearby, etc. In some embodiments, if auto-capture is disabled, and the system (e.g., VR engine) may indicate (e.g., visually) to the user that the user is in a popular location, show one or more names of friends of the user that took a selfie in the location, and recommend taking a selfie or video. In some embodiments, an object present in the VR location is popular and users take images of the object or take selfies in the object's vicinity. The user may specify to generate a 3D image of a view that matches those of their friends. Other options may include the automatic capture of content upon entering a new environment or when a user's friend(s) are nearby, etc. An object can be popular based on various criteria, including the number of likes that it receives or the number of people (e.g., users) that captured an image of such an object. In some embodiments, the system (e.g., VR engine) may recommend a popular view based on previous screenshots and previous rendering data collected from any headsets or extracted from screenshots. For example, the system may recommend to the user to position themselves in specific coordinates before taking the selfie or screenshot.

As a result of the use of these techniques, enhanced representations of captured VR content may be created and VR content may be automatically captured (e.g., storing of a view of a VR environment and/or enhanced representations of a view of a VR environment). For example, these techniques may enable improvement of content creation of 3D photography (e.g., 3D content). In some embodiments, the system and methods may be applied to enhance a user's experience in any suitable type of environment, (e.g., an extended reality (XR) environment—augmented reality (AR), virtual reality (VR), mixed reality (MR) environment, or some combination thereof, a video game environment, etc.) and any suitable type of content (e.g., 3D content for a 3D experience, video game content, any suitable XR content—AR content, VR content, MR content, or some combination thereof, etc.).

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
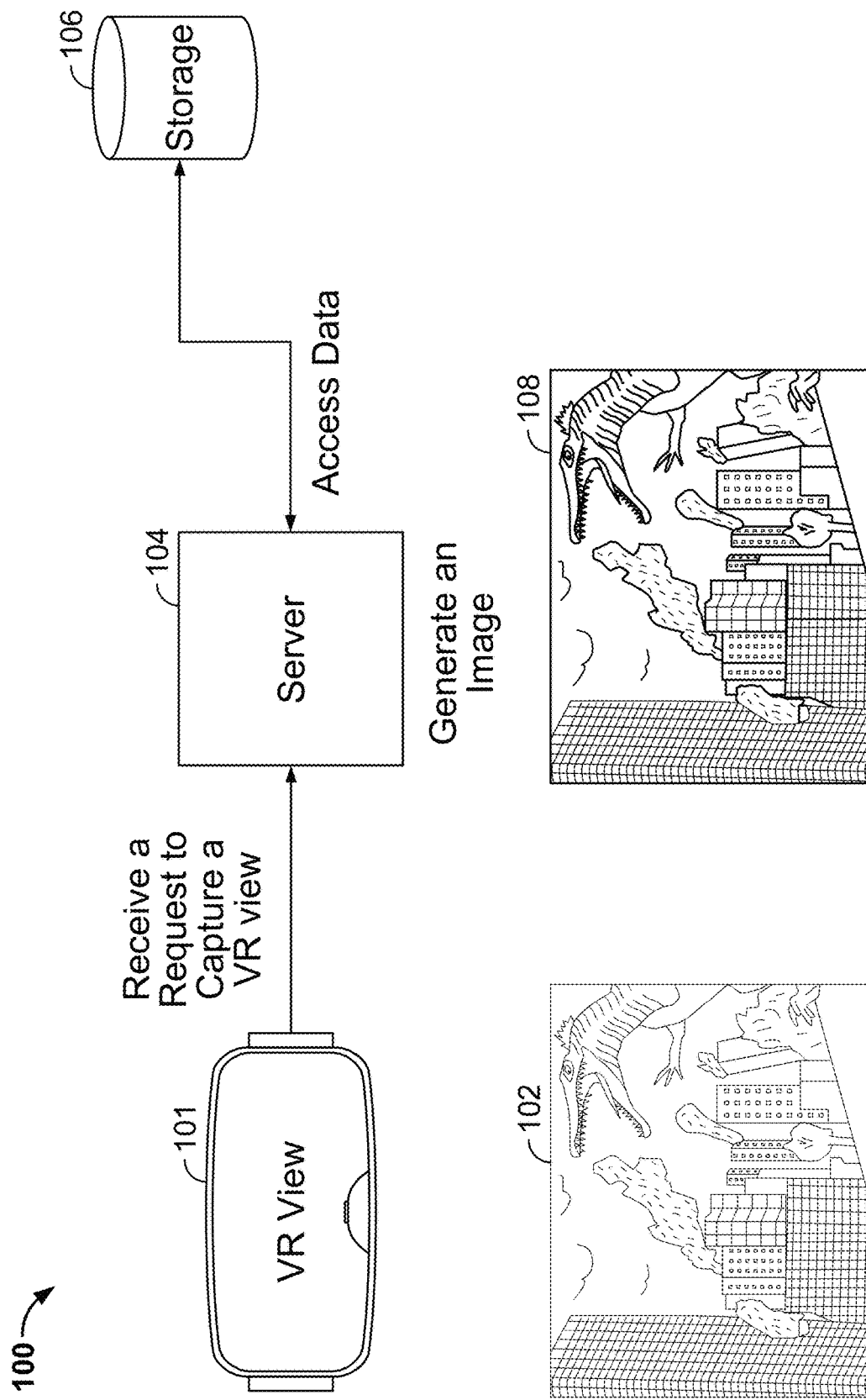
FIG. 1A shows an illustrative example of a system creating enhanced content for VR, in accordance with some embodiments of this disclosure.

FIG. 1A shows an illustrative example of a system creating enhanced content for VR, in accordance with some embodiments of this disclosure. The system 100 includes a user device 101, a server 104, and a storage 106. In some embodiments, system 100 may include different or additional entities. For simplicity, only one user device 101, server 104, and storage 106 is shown; however other embodiments may include any suitable number of user device(s) 101, server(s) 104, and storage(s) 106.

User device 101 is a device configured to present VR content. Although the user device 101 is depicted as a VR headset, the user device 101 may be any suitable user device. In some embodiments, user device 101 may include a VR engine or a rendering engine. Server 104 is a computer system configured to receive, store, and transmit data to a user device 101. Server 104 may be any suitable server (e.g., remote server, cloud, etc.). In some embodiments, server 104 may include a VR engine or a rendering engine. Storage 106 may be any suitable type of storage. Although server 104 and storage 106 are depicted as separate entities, in some embodiments the storage 106 may be included in server 104.

An example of a VR view 102 is shown in FIG. 1A. Server 104 may generate VR views for display on the user device. For example, the server 104 may generate a VR view 102 for display to the user device 101. The server 104 may access data for the VR view 102 from storage 106 and render the data for display on the user device 101. The server 104 may transmit the VR view 102 to the user device 101.

The user device 101 may display a VR view 102 (e.g., view of a virtual 3D environment). The user device 101 may receive inputs from a user. For example, user device 101 may receive a request (e.g., user input) to capture an image (e.g., screenshot, photo, live photo, video, etc.) of the VR view 102. In some embodiments, the user device 101 captures the VR view 102 (e.g., as a screenshot, photo, live photo, video, etc.) to be stored locally on the user device 101. For example, the user device may capture a low-quality, low resolution image. In some embodiments, the user device 101 transmits a request to the server 104 to capture the VR view 102. The user device 101 may receive the captured VR view 102 from the server 104.

Server 104 may generate an image based on a request for capturing an image from the user device 101. For example, the server 104 may receive a request to capture a VR view 102 from the user device 101. The server 104 may access data from storage 106 (e.g., data of the virtual 3D environment). For example, the data may include data used to generate the view (e.g., VR view 102) for display on the user device, and additional data of the virtual 3D environment other than the data used to generate the view of the virtual 3D environment for display on the user device. The server 104 may generate an image based on (a) the data used to generate the view of the virtual 3D environment for display on the user device, and (b) the additional data of the virtual 3D environment. As an example, the server 104 may generate an image 108 (e.g., enhanced image) as a high-quality image of the VR view 102 (e.g., as displayed on a user device 101). Additional detail regarding creating enhanced content for VR can be found in the detailed description of FIG. 7.

In some embodiments, the user device 101 captures a low-quality, low resolution image, and the server 104 (e.g., remote server, cloud) generates a higher quality image than the image captured at the user device 101, which may be transmitted to user device 101 (e.g., as an upgrade to the previously captured image). The server 104 may store the image 108 (e.g., in storage 106, or any suitable storage). For example, the image 108 may be stored as associated with a user ID associated with the request to capture the VR view 102. The server 104 may transmit data representing the image 108 to the user device requesting the capture of the VR view. In some embodiments, the server 104 may transmit data representing the image 108 to another user device (e.g., a user device that did not request capture of the VR view). For example, the user may request capture of the VR view to generate an image to be accessed by another device (e.g., user may have a preferred device to access images, or may want to capture the image to share with another user, etc.).

In some embodiments, some or all of the logic for the creation of enhanced images is executed by the user device 101, the server 104, or by some combination thereof. For example, the user device 101 may create the enhanced images instead of server 104.

In some embodiments, the server 104 may create an enhanced image that is an 3D image. For example, the additional data of the virtual 3D environment may be depth data for the view of the virtual 3D environment. The server 104 may generate an interactive image (e.g., 3D image, 3D photo) configured to display different view angles of the virtual 3D environment based on user interface input from a user device. The user interface input may be tilting a user device. For example, a user device may be a mobile phone, and a user may tilt the mobile phone so that it is positioned at a different viewing angle than a previous position. The interactive image may display a different view angle of the virtual 3D environment at the different viewing angle on the mobile phone. The user interface input may be rotating a user device. For example, the interactive image may display a series of different view angles of the virtual 3D environment as the viewing angle changes with rotating the mobile phone. The user interface input may be a scrolling on the user device. For example, the scrolling input on the user device may indicate a change in viewing angle, and the interactive image may display a series of different view angle based on the scrolling input.

In some embodiments, the server 104 may create an enhanced image that includes at least a portion of an object in a 3D environment that is not included in the view of the virtual 3D environment. For example, the enhanced image may include an occluded view, a shifted view, a wider field of view, or a combination thereof. The enhanced image may be a disoccluded view, in which the original view to be captured may include a first object blocking a second object in the view. The enhanced image may be the original image from a different view, in which the first object no longer blocks the second object, or in which a portion of the second object is visible in the new view. The enhanced image may be an image that is shifted in view (e.g., shifts image data to the right, left, top, and/or bottom of the image to cover a view not previously viewed). The enhanced image may be the original image with a wider field of view (e.g., includes more image data around the original image to the right, left, top, and/or bottom of the image).

In some embodiments, the server 104 may create an enhanced image that is the image captured at a different time. For example, the enhanced image may be a same view of the original image captured at a different time.

For example, the VR experience perceived through a headset may show limited picture resolution, degraded contrast ratio, reduced color gamut, etc. primarily due to less capable displays and rendering. However, resolution of a VR environment or experience may not be limited to what has been displayed on a headset. Video essence and metadata for the VR experience may be available as high-quality visual information and may be used to create enhanced content (e.g., 3D photo, screenshot, image, video, etc.) for VR.

In the content creation and rendering for VR and stereo video experiences, the video essence and metadata may include more information that can be leveraged to create plausible 3D photo experience. Capturing moments from VR and/or stereo 360 video may enable generating high-quality visual information. The high-quality visual information may be used as an input to creating 3D photography. For example, high resolution pictures may be available for both views perceived by the left and right eyes. The availability of dual or multiple views may offer a better representation of the captured moment. The system may access metadata used to render, and re-render, the immersive experience. The metadata may enable creative choices in optimizing the intended 3D experience. Metadata may be applied to creating new views which may not have been experienced by the VR user during the session of playback through a headset.

A system may access video or an image sequence, which may provide temporal data (e.g., missing from a single image). Temporal information may be used in a process of filling in occluded detail. In one aspect, when capturing screenshots, a "Live VR Photo" may be enabled to record a period of time before and after a moment of pressing (e.g., a second before and a second after the moment of pressing). For example, a user may press (e.g., touch) a user input interface of a user device (e.g., indicator displayed on a user interface and/or manual button of a user device, or any suitable user input interface) to indicate that the user wants to capture a Live VR Photo. In some embodiments, Live VR Photo may use video or frames stored after the moment of pressing. In some embodiments, Live VR Photo may use video or frames before the moment of pressing. In some embodiments, Live VR Photo may use video or frames before and after the moment of pressing. In some embodiments, the system may include a buffer (e.g., temporary buffer). The system may store video or frames of what is displayed to a user on a user device. For example, the system may store video or frames before and/or after the moment of pressing. In some embodiments, the system may use the video or frames stored in the buffer to generate the Live VR Photo. In some embodiments, the system may continuously record a video or frames of a most recent time period, and store the video or frames in a buffer and/or storage. For example, the system may continuously record a video or frames of the last few seconds (e.g., a second, two seconds, or any suitable time period) and store the video or frames in the temporary buffer and/or storage. In some embodiments, the video or frames may be kept in memory or in temporary storage, as something that is not saved or stored in storage unless requested (e.g., by capturing a Live VR Photo). In some embodiments, the system may use the temporary buffer to capture video or frames before the moment of pressing, and the system may record video or frames after the moment of pressing. In some embodiments, the system may a combination of saving or storing the video or frames from the temporary buffer and saving or storing the recorded video or frames after the moment of pressing to capture a Live VR photo.

In some embodiments, the system may use a combination of both the capturing video before and after (e.g., when a photo is taken), storing the captured video or frames along with the intended frame (photo), and a function of playback (showing a series of images before and after or video which was captured and stored along with the image). In some embodiments, the "live" aspect is based on the user interaction of touching and holding the "live" photo causing the before and after to play.

Additional information may exist in VR and stereoscopic creation and rendering. For example, different perspectives of an object of interest may appear in the left and right eyes with varying occlusions. This additional data may represent a dataset collectively captured by multiple virtual cameras at the moment of capturing. Use of this additional data may enable improved augmentation in creating 3D photos. The 3D photos may be shared with others as the moments that one experiences in VR. The posting, sharing and consumption of such augmented 3D photography may be without additional headsets or eyewear devices. The captured VR segment may represent a specific moment of interest. The captured VR segment may not be a replica of a video sequence, and may be in the form of a single frame or a high-quality point cloud. The 3D photo may support scroll-through of a viewer and may provide visual detail that may be possibly perceived in one of the views in a headset.

In some embodiments, a system and method enables a user to "take" a picture or video using a virtual camera within a VR engine/headset, to instruct a remote rendering device such as a computer or other device capable of rendering a high resolution 3D scene, and to automatically transfer the enhanced image or video to a user's real device (such as a mobile device) or to a user's cloud storage device such as Apple iCloud to enable photos and videos to be shared and viewed in the same way that photos and videos taken with real cameras are shared and viewed.

High-Resolution/High-Complexity VR environment, objects, avatars, and other visual elements may be stored in a cloud datastore. These objects and the environment may be mapped to lower resolution or lower complexity versions that are used for rendering within a VR headset to achieve a high frame rate. When a user virtually "records" or "takes" a picture within the VR experience using a camera object within the VR engine, the scene or "location" within the VR environment as well as the position of the camera, the viewport of the camera, the motion or vector of the camera and other information used to "re-create" the image or video may be sent to the remote rendering device (computer or cloud renderer) for processing. The remote rendering device may re-create the scene using higher complexity (high polygon count for example) objects or higher resolution rendering. Further, details such as movement when the camera is a virtual "video" camera may be properly addressed such as blurring due to motion and speed, reflections based on ray tracing or other lighting effects.

In some embodiments, systems and methods may produce an enhanced image using information such as metadata used by the HMD to render an immersive experience and create views. Systems and methods may generate an enhanced image using temporal data from a captured video or sequence of images to assist in filling in occluded data. Systems and methods may create an enhanced image from a captured scene using high resolution objects that are stored in a database. For example, a VR content database may store high-resolution objects, but a low-resolution object may be loaded into a VR engine due to limitations on resolution in VR (e.g., resolution for texture may be limited to 1024× 1024). Systems and methods may generate an enhanced image using metadata of the VR environment with the remote rendering device. For example, a scene or "location" within the VR environment as well as the position of the camera, the viewport of the camera, the motion or vector of the camera and other information to "re-create" the image or video may be sent to the remote rendering device. Systems and methods may use the properties of the VR camera to produce images with effects similar to a corresponding real camera (e.g., user of filters, portrait mode, Pano, etc.).

Figure 1B:
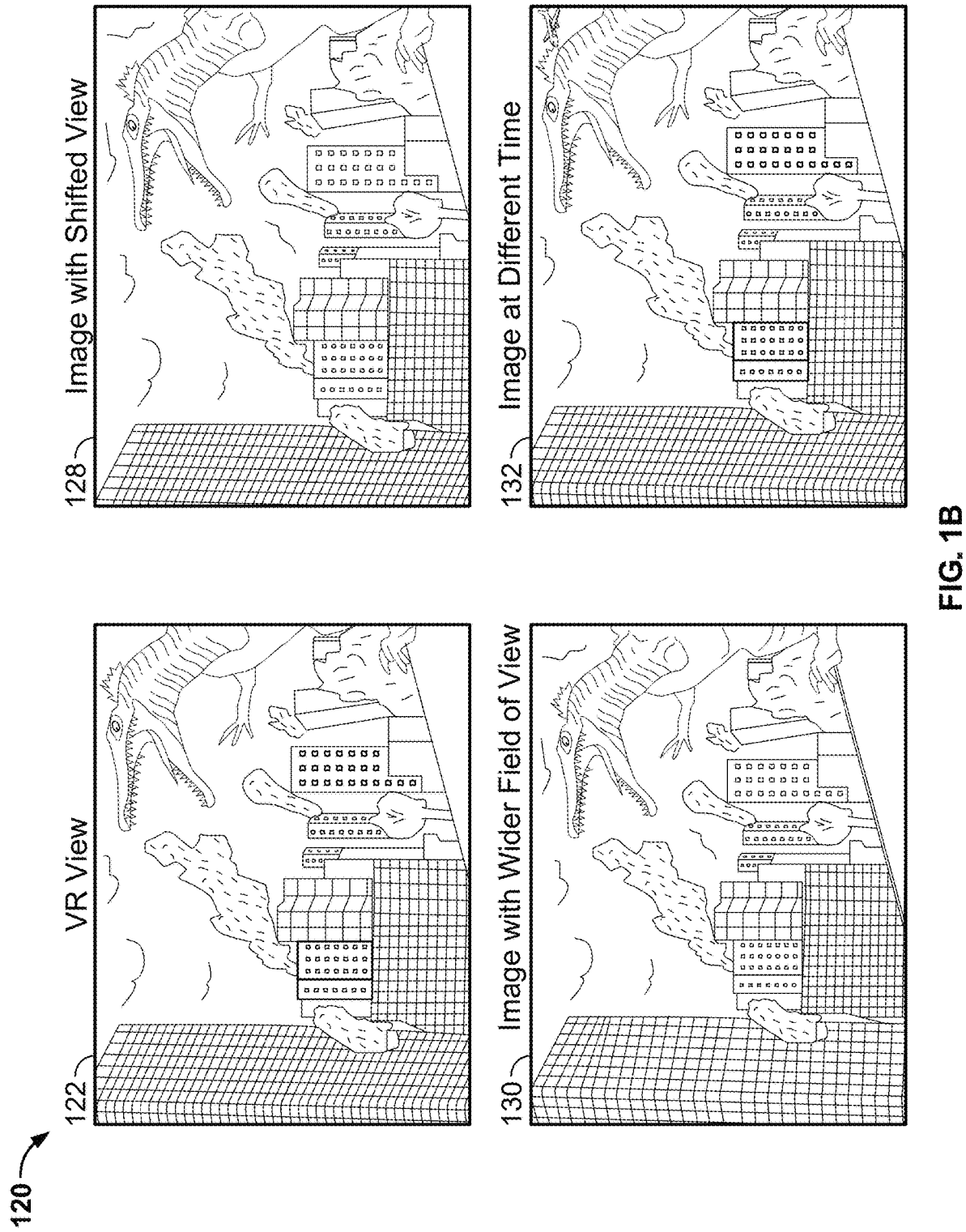
FIG. 1B shows an example of a VR view and enhanced images for VR, in accordance with some embodiments of this disclosure.

FIG. 1B shows an example of a VR view and enhanced images for VR, in accordance with some embodiments of this disclosure. In some embodiments, VR view 122 corresponds to VR view 102 (e.g., as a view displayed on user device 101), and enhanced images 128, 130, and 132 correspond to image 108 of FIG. 1A (e.g., as an image generated by server 104). The example 120 shows VR view 122 which is the same as the VR view 102 for purposes of comparison to enhanced images 128, 130, and 132. The enhanced images 128, 130, and 132 depict an image with a shifted view, an image with a wider field of view, and an image at a different time, respectively, from VR view 122. The image 128 shows a shifted view of VR view 122. For example, image 128 is the VR view 122 shifted towards the top and right. Image 128 shows additional data to the top and the right of VR view 122 (and less image data to the bottom and left of the image). The image 130 shows a wider field of view of the VR view 122. The expansion in view of image 130 is in the top, bottom, left, and right of the VR view 122. The image 132 shows the VR view 122 at a different time.

For example, image 132 shows an airplane that flew into the scene at a time before or after the view was captured. For example, if the airplane occurred before the time VR view 122 was captured, the airplane may be occluded at a later time by the dinosaur at the time VR view 122 was captured. As another example, the airplane may have flown into the scene after the time VR view 122 was captured.

Figure 1C:
FIG. 1C shows an example of a VR view and enhanced image with flash, in accordance with some embodiments of this disclosure.
Figure 1C:
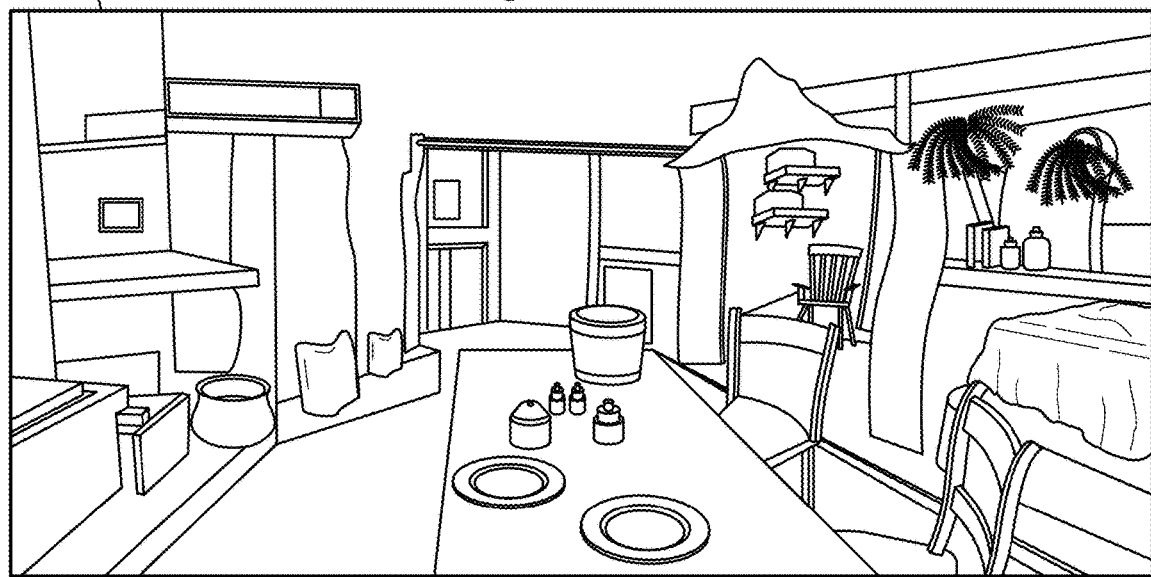

FIG. 1C shows an example of a VR view and enhanced image with flash, in accordance with some embodiments of this disclosure. In some embodiments, VR view 152 corresponds to VR view 102 (e.g., as a view displayed on user device 101), and enhanced image 154 corresponds to image 108 of FIG. 1A (e.g., as an image generated by server 104). The example 150 shows a VR view 152, which may be a VR virtual camera photo before flash process. Image 154 may be VR virtual camera photo after remote rendering of flash (e.g., image with flash). For example, VR view 152 may be an example of a VR view on the user device 101 that a user may want to capture. In some embodiments, a virtual camera may emit a virtual camera flash to "light" a dark environment in the same manner as a real camera would. The flash information metadata may be transmitted along with the other data to be re-created by the remote rendering device.

In some embodiments, the virtual camera may mimic a real camera's lens including focal length, aperture, and other physical elements. This data may be transmitted along with the other data such as distance from the various virtual objects within the VR scene to produce blur effects, lighting effects including but not limited to over or under saturated images, out of focus images, reflections, or lens flares by a remote rendering engine.

Figure 2A:
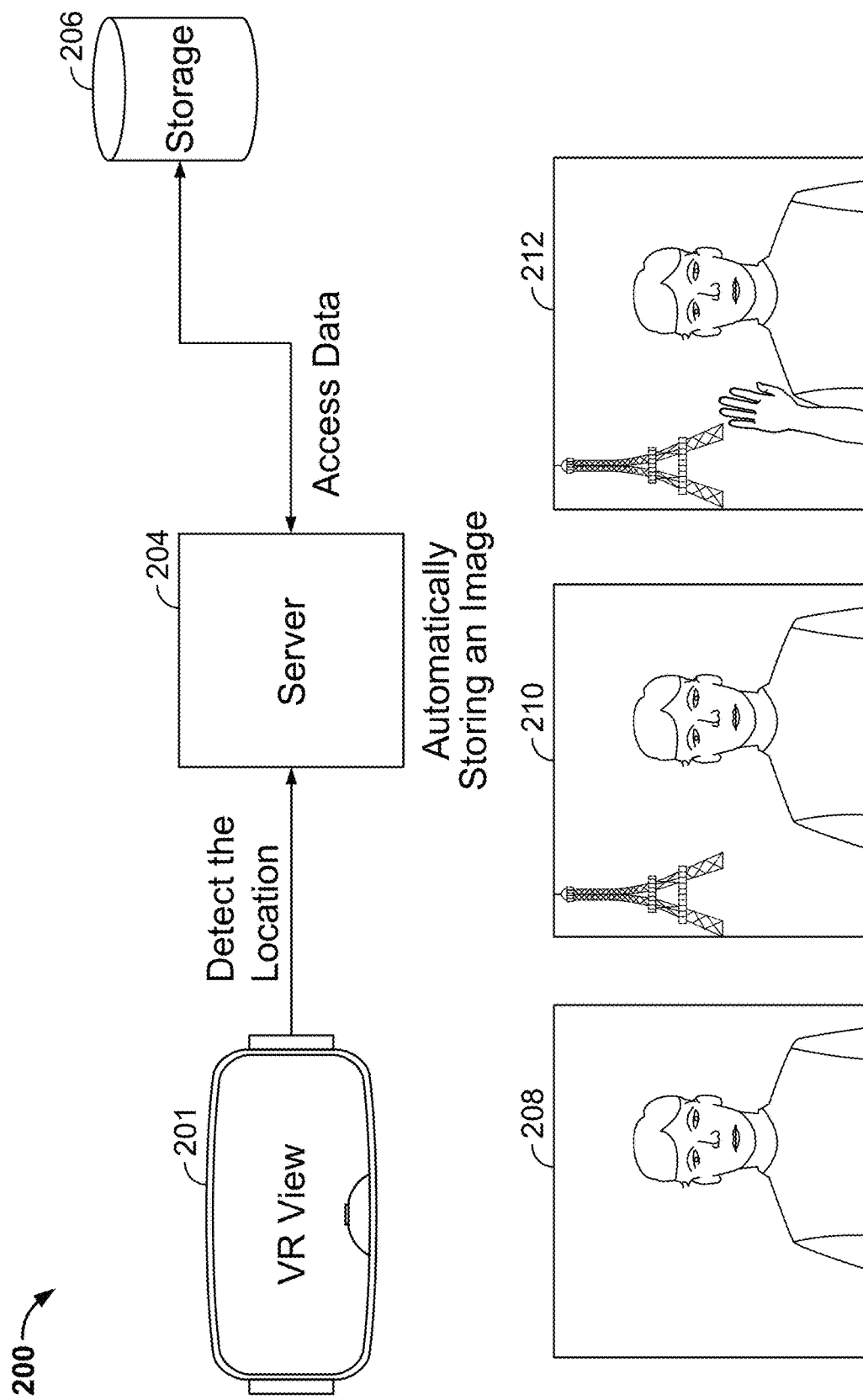
FIG. 2A shows an illustrative example of a system automatically storing an image for VR, in accordance with some embodiments of this disclosure.

FIG. 2A shows an illustrative example of a system automatically storing an image for VR, in accordance with some embodiments of this disclosure. The system 200 includes a user device 201, a server 204, and a storage 206. In some embodiments, system 200 may include different or additional entities. For simplicity, only one user device 201, server 204, and storage 206 is shown; however other embodiments may include any suitable number of user device(s) 201, server(s) 204, and storage(s) 206. In some embodiments, user device 201, server 204, and storage 206 of FIG. 2A corresponds to (e.g., is similar to, the same as) user device 101, server 104, and storage 106, respectively, of FIG. 1A. For example, server 204 may be similar to or the same as server 104, and each server may create enhanced content for VR and may automatically store (e.g., capture) an image for VR. However, while FIG. 1A shows an illustrative example of server 104 receiving a request to capture the view of the virtual 3D environment and generating an enhanced image, FIG. 2A shows an illustrative example of server 204 detecting a location of a view of the virtual 3D environment matches one or more criteria and in response to detecting that the location matches the one or more criteria, automatically storing the image. Additional detail regarding detecting the location matches criteria and automatically storing the image can be found in the detailed description of FIG. 8.

FIG. 2A shows example image 208 that may be stored by server 204. In some embodiments, image 208 may correspond to (e.g., is similar to, the same as) a VR view (as displayed) on user device 201. In some embodiments, image 208 may be an enhanced image. For example, the example image 208 may correspond to (e.g., is similar to, the same as) example image 108 shown in FIG. 1A (e.g., an enhanced image). In some embodiments, images 108 and 208 may be any suitable images except that images 208 are automatically captured instead of images 108 being captured in response to a request.

In some embodiments, image 208 is an enhanced image. For example, image 208 may be enhanced in any suitable manner (e.g., enhancements described in relation to FIGS. 1A, 1B, and 1C, etc.). In some embodiments, the system may access data used to generate the view of the virtual 3D environment for display on the user device, and the system may access additional data of the virtual 3D environment other than the data used to generate the view of the virtual 3D environment for display on the user device. The system may generate the image based on (a) the data used to generate the view of the virtual 3D environment for display on the user device, and (b) the additional data of the virtual 3D environment.

In some embodiments, the image 208 is not an enhanced image (e.g., an image representing the VR view on user device 201 as a screen capture, photo, video, etc.). For example, image 208 may be an actual view rendered to a user. For example, the system may access data used to generate the view of the virtual 3D environment for display on the user device, and the system may generate the image based on the data used to generate the view of the virtual 3D environment for display on the user device. In some embodiments, when the image (e.g., automatically stored image) is an actual view rendered on a user device to a user, the system may access additional data to give the user an option to enhance or to modify the image.

In some embodiments, image 208 may be a selfie of an avatar in a virtual 3D environment. For example, image 208 shows an example selfie that may be automatically captured. FIG. 2A shows example images 210 and 212 that correspond to image 208 (e.g., as being automatically stored in server 204). Image 210 shows a selfie that may be automatically captured with a popular object (e.g., Eiffel tower). Image 212 shows an example selfie with an avatar with a popular object in a different pose (e.g., waving "hi"). In some embodiments, the example images 210 and 212 may be automatically captured by placing the avatar in the scene to mimic a popular photo by other users or a photo by a friend of the user. In some embodiments, an enhanced image is generated by using additional information to place the avatar in the scene at a particular view to mimic the view of the popular photo by other users or by the friend of the user. In some embodiments, the view that is rendered to the user may be used with information about the avatar to place the avatar in the scene to mimic the popular photo by other users or the photo by the friend of the user.

Figure 2B:
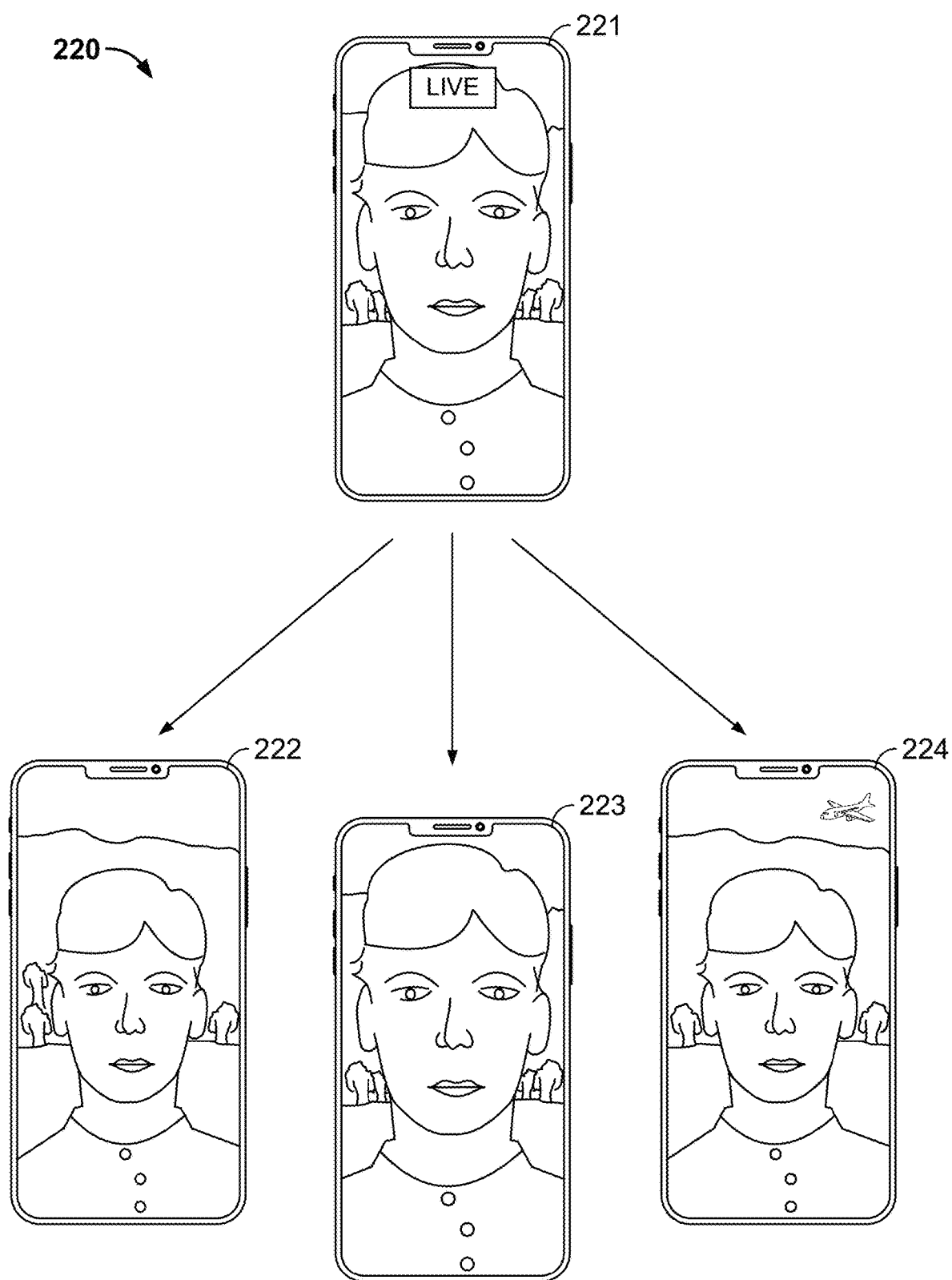
FIG. 2B shows an example of enhanced VR content as a live photo, in accordance with some embodiments of this disclosure.

FIG. 2B shows an example of enhanced VR content as a live photo, in accordance with some embodiments of this disclosure. For instance, example 220 shows a live photo viewed on a mobile device. In some embodiments, an Apple Live Photo may be created using the disclosed approach and viewed on a real Apple device. In some embodiments, the live photo may be any suitable live photo. The live photo may be enhanced in any suitable manner. For example, the live photo may have a higher resolution than what is displayed on a user device. The live photo may include images of an avatar of the user at a time before and/or after the view was captured. For example, FIG. 2B shows a live photo 221, which may include images 222, 223, and 224 that are captured at different times. For example, image 223 may correspond to image 221 displayed on a user device (e.g., representing the live photo, although any suitable image may be used to represent the live photo). The image 222 may be captured before the time image 223 was captured, and image 224 may be captured after the time image 223 was captured. For example, in the live image 221 that was captured, the avatar may have moved closer to a virtual camera and then further away as airplane flew by in the background. Image 222 shows an avatar further away from a virtual camera. Image 223 shows an avatar closer to the virtual camera than image 222. Image 224 shows the avatar further away from the virtual camera with an airplane flying in the background.

In some embodiments, systems and methods may use "Live VR Photo" to provide the flexibility in the later processes of creating 3D photography. For example, capturing of a VR moment may collect input so that the 3D photography creation may be optimized and customized to determine what a user may want to share. Live VR Photo may not store all the visual detail (e.g., unlike other types of live photo) which takes a lot of storage (e.g., for mobile devices). Live VR Photo may capture the metadata including object indexes, camera angles, time, condition, etc. to render/reproduce the VR moment. The capture initiated by a user may define what the user likes to share. For example, two captures of a same point cloud representation but from different virtual cameras renders two different 3D photos. The consumption of 3D photography (e.g., on FACEBOOK) may come with a limited allowance in angles, movement, etc. The definition of the "center view" by a user may be part of the creative choices.

In one embodiment, systems and methods generate a series of 3D images from a VR moment. For example, a first 3D image may depict the actual view that was rendered to the user (e.g., displayed on a user device), while at least a second 3D image may be generated to depict an unrendered view (e.g., not displayed on a user device). The number of 3D images that may be generated may depend on the availability of metadata in the capture image or series of frames. For example, an image captured in a small room may not yield as many 3D images as an image or series of images captured on a beach in VR. In yet another embodiment, the second image may be generated based on a popular unexplored view. The second image may be based on threshold numbers of users that experienced the view which a particular user did not experience or was not rendered to the user. The unrendered views may be additional visual data, or from different virtual cameras, which can be used to create the 3D photography. The system and methods may enable users to create albums and collages based on various events and locations within a VR environments, create slideshows, etc.

In yet another embodiment, the capture can be triggered manually or automatically. The HMD may share the metadata that was used by the rendering engine to render the view, and the 3D images can be distinguished from each other. For example, one image may be labeled "new." An image processing algorithm may generate these images based on user preferences and rules and auto-capture rules. The auto-capture rules can be based on user settings and or personalized. In another embodiment, a user might specify to automatically capture an image in popular locations where other users captured an image or where their friends captured an image. Similarly, if auto-capture is disabled, the VR engine might indicate (e.g., visually) to the user that the location they are in is popular and show a name of a friend(s) that took a selfie in that location and recommend taking a selfie or a video. In one embodiment, an object present in the VR location is popular and users take images of such object or take selfies in its vicinity. In such embodiment, the user can specify to generate a 3D image of a view that matches those of their friends (e.g., best friends, social media friends). Other options can include the automatic capture of content upon entering a new environment or when a user's friend(s) are nearby, etc. An object can be popular based on various criteria, including the number of likes that it receives or the number of people (e.g., users) that captured an image of such object.

In another embodiment, the VR engine may recommend a popular view to the user based on previous screenshots and previous rendering data collected from any headsets or extracted from screenshots (e.g., this may be similar for other embodiments, and could include sharing the HMD issuing a POST command with metadata about the view/location within VR/screenshot to an analytics server). For example, the VR engine may recommend to the user to position themselves in specific coordinates before taking the selfie or screenshot—i.e., this assists or recommend the best "actual view" or virtual camera to use in VR capturing.

Figure 3A:
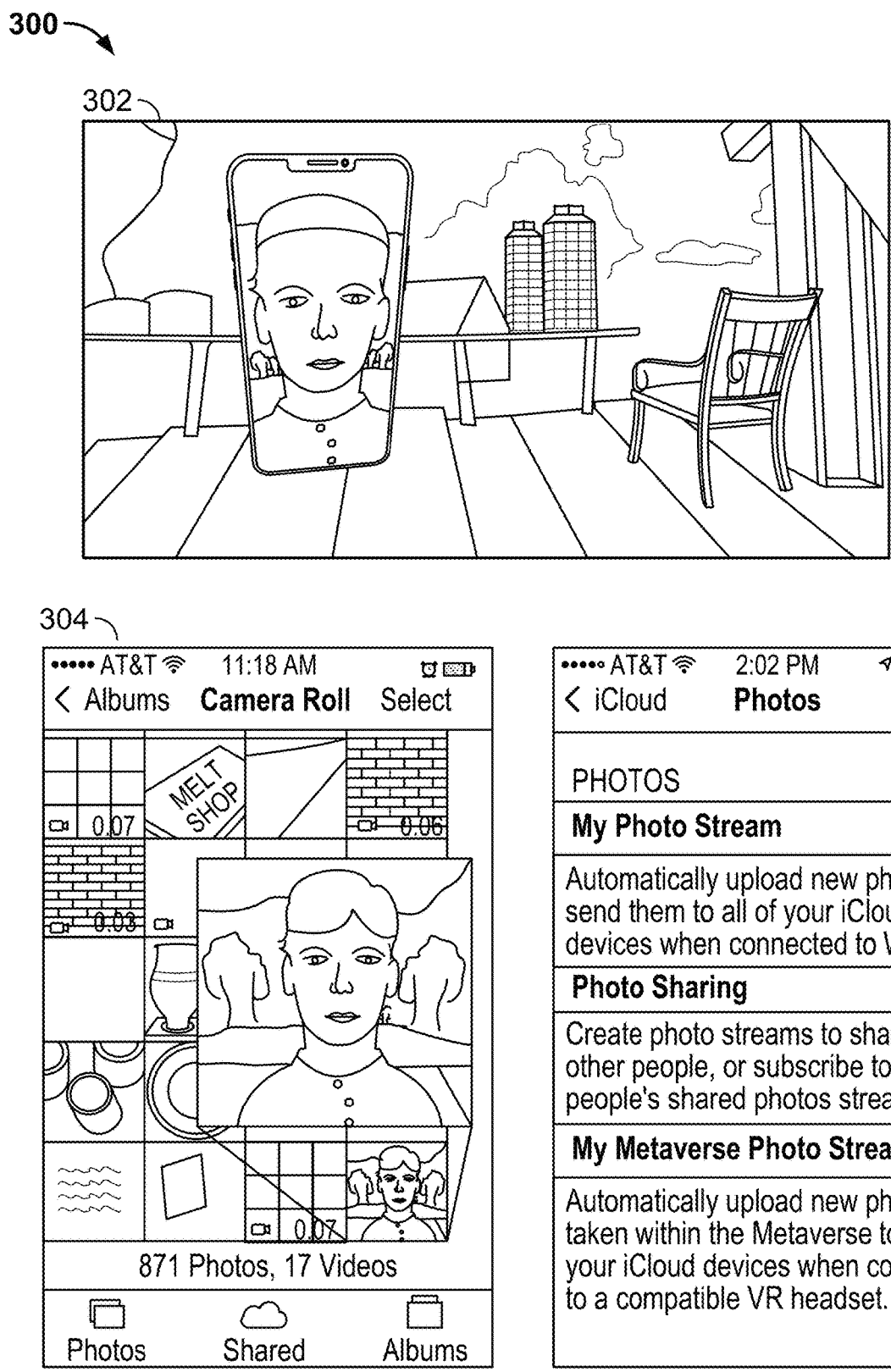
FIG. 3A shows an example user interface for capturing a selfie within a VR environment and storing an enhanced selfie to a camera roll, in accordance with some embodiments of this disclosure.

FIG. 3A shows an illustrative example of user interfaces for capturing a selfie within a VR environment and storing the selfie to a camera roll, in accordance with some embodiments of this disclosure. Example 300 shows a user interface 302 of a view displayed in a VR headset of a virtual selfie (e.g., as seen in a VR headset). In some embodiments, the view may assist a user to capture a selfie within the VR environment. Example 300 shows a user interface 304 of a camera roll displayed on a real user device (e.g., mobile device). The camera roll on a real device (e.g., mobile device) may show a photo (selfie) taken within the VR environment with remote rendered high complexity/quality models. In some embodiments, the selfie may be an enhanced selfie. For example, the selfie may include additional background view than the selfie captured by the user (e.g., as shown in user interface 302), and the selfie may have a hairstyle that is changed from the selfie captured by the user (e.g., selfie with short hair shown in user interface 302, but appearing with a different hairstyle in camera roll). The user interface 304 may display options for user input to enable a user set preferences relating to a photo stream, photo sharing, and a metaverse photo stream. For example, user interface 304 displays a user settable option for a metaverse photo stream—"Automatically upload new photos taken within the metaverse to all your iCloud devices when connected to a compatible VR headset." In some embodiments, instead of an iCloud device, any suitable device may be used (e.g., identified user devices, user devices associated with a user ID, etc.).

Figure 3B:
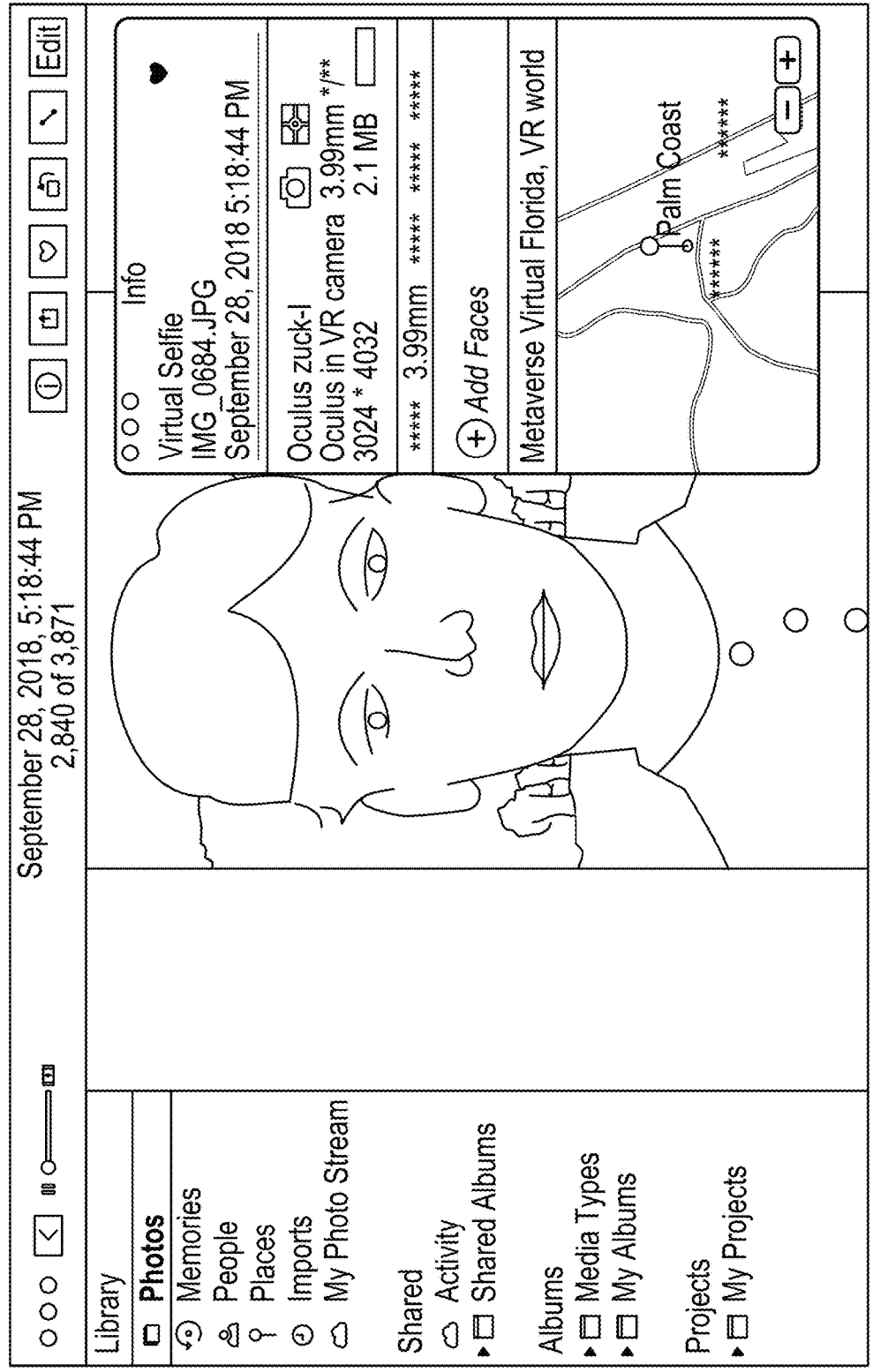
FIG. 3B shows an example user interface for displaying enhanced images with embedded VR photo metadata, in accordance with some embodiments of this disclosure.

FIG. 3B shows an example user interface for displaying enhanced images with embedded VR photo metadata, in accordance with some embodiments of this disclosure. In some embodiments, virtual metadata including but not limited to location data (within a metaverse coordinate or locating system for example), date time, scene information, and other data are embedded into the enhanced image in the same manner as image information is stored within photos or videos. The example 320 user interface displays a selfie with embedded VR photo metadata. For example, the Info panel in the user interface 300 may display virtual metadata such as location data (e.g., "Metaverse Virtual Florida, VR world," "Palm Coast," etc.) and date time information (e.g., Sep. 28, 2018 at 5:18:44 PM), scene information (e.g., "Oculus in VR camera," type of virtual camera used, resolution, etc.), and other data (e.g., any suitable information).

In another embodiment, a virtual camera may be of a particular make and model. For example, a virtual camera may be embedded within a virtual twin of a mobile device, such as when the virtual mobile device is an authenticated type. For example, a virtual camera may be an iPhone 11 Pro virtualized camera, and additional filters, digital zoom capability and other special and proprietary post processing may be employed. For example, a virtual twin iPhone camera may implement "Live photos" when the virtual camera is used to take a virtual image. The resulting image may mimic or implement the same functionality as Apple Live Photos do on a real device.

Figure 3C:
FIG. 3C shows an example user interface for requesting user input and displaying an enhanced image within a VR headset, in accordance with some embodiments of this disclosure.
Figure 3C:
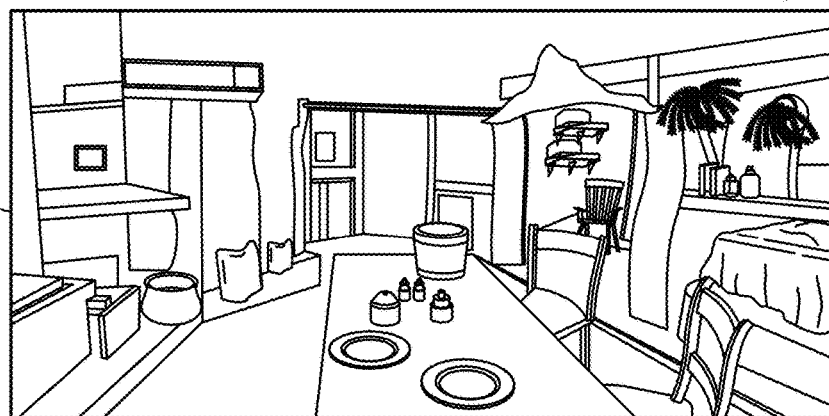
Figure 3C:
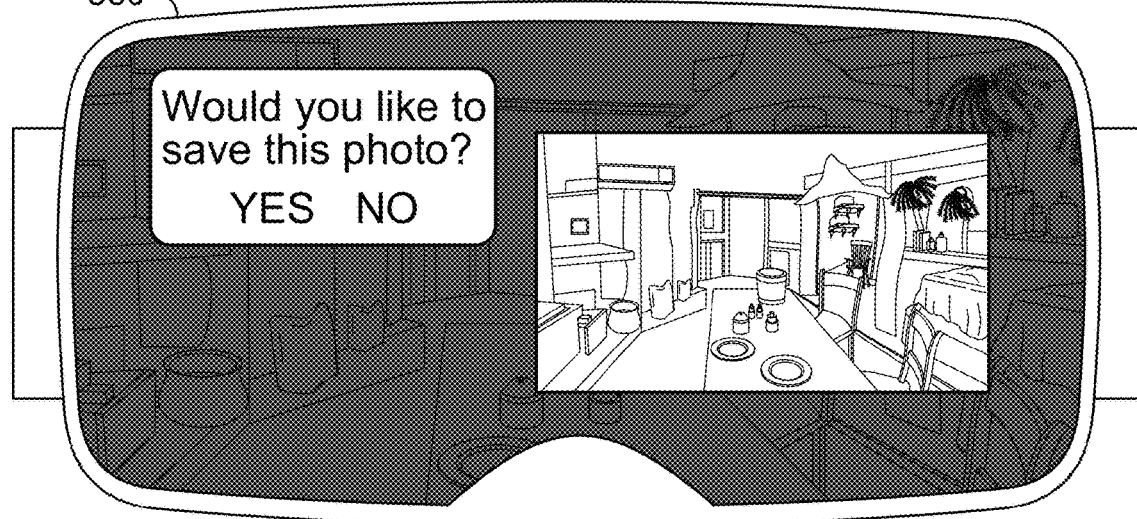

FIG. 3C shows an example user interface for requesting user input and displaying an enhanced image within a VR headset, in accordance with some embodiments of this disclosure. In some embodiments, an enhanced image (e.g., rendered image) may be displayed within the VR headset or on the virtual display of a virtual device within the VR headset so that a user may choose to keep, re-take, or delete the image. In some embodiments, images 340 and 350 correspond to (e.g., is the same as) images 152 and 154, respectively, of FIG. 1C. For example, image 340 may be an example of a VR view on the user device 101 that a user may want to capture. In some embodiments, a virtual camera may emit a virtual camera flash to "light" a dark environment in the same manner as a real camera would. The flash information metadata may be transmitted along with the other data to be re-created by the remote rendering device.

Image 340 may be a VR virtual camera photo before flash process. Image 350 may be VR virtual camera photo after remote rendering of flash. A confirmation may be shown to the user within the VR headset with the resulting remotely rendered flash image. The enhanced image (e.g., image 350 after remote rendering of flash) may be displayed on a user device (e.g., headset) with a prompt for user input (e.g., "Would you like to save this photo?" and options "YES" and "NO"). The user may choose to save the photo by selecting "YES" or may choose to delete the image by selecting "NO". In some embodiments, although not shown in FIG. 3C for simplicity, the user may be given the option to re-take the image.

Figure 4A:
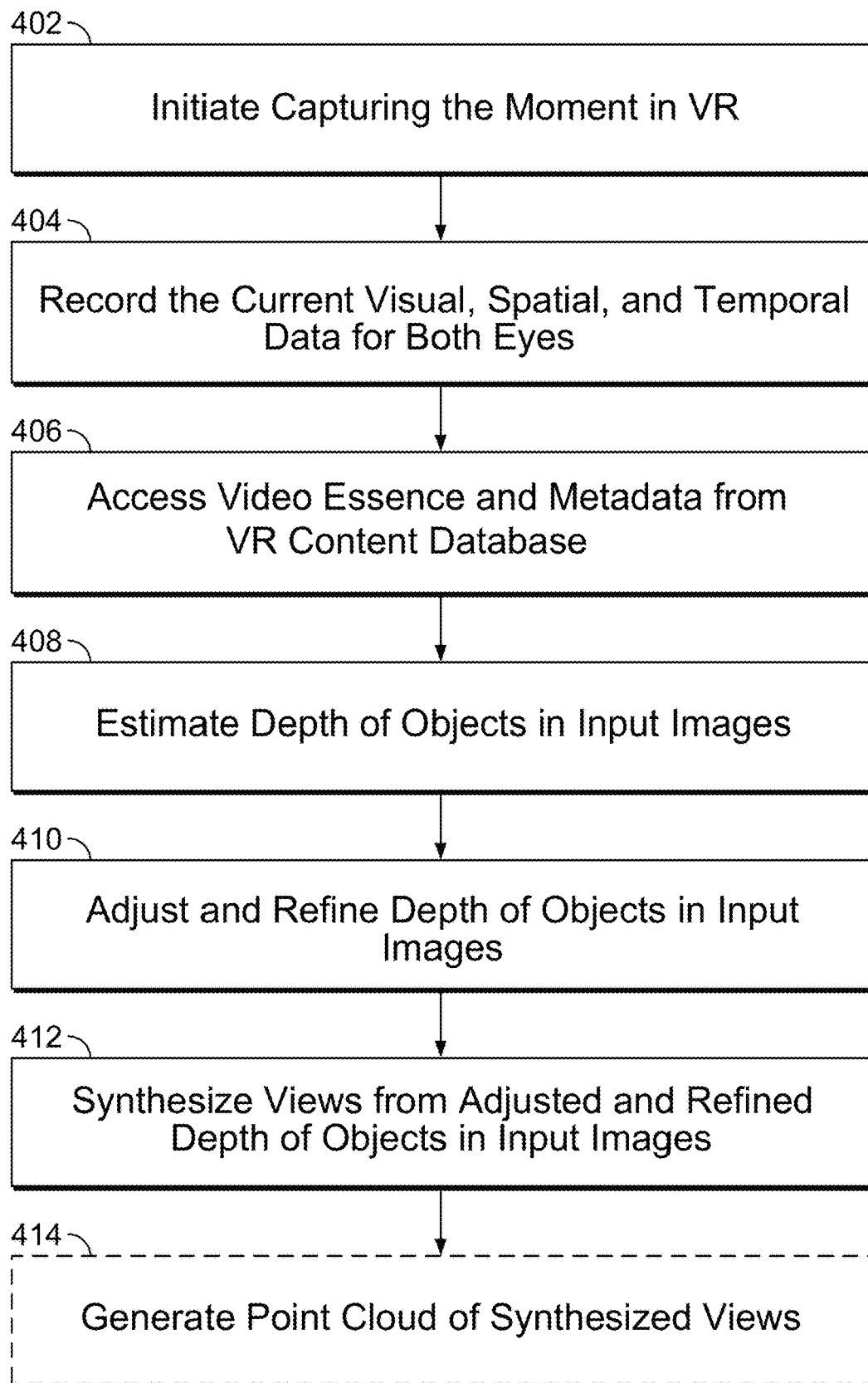
FIG. 4A is a flowchart of a detailed illustrative process of generating a 3D image from video essence and metadata from VR content storage, in accordance with some embodiments of this disclosure.

FIG. 4A is a flowchart of a detailed illustrative process of generating a 3D image from video essence and metadata from VR content storage, in accordance with some embodiments of this disclosure. For example, the flowchart may show a sequence of operations to capture, by multiple virtual cameras, the moment in VR and to output representative data (e.g., steps 402-406). The output video and metadata may be used as spatial and temporal visual information for creating augmented (enhanced) 3D photography (e.g., steps 408-414).

In various embodiments, the individual steps of process 400 may be implemented by one or more components of the devices and systems of FIGS. 1A, 2A, 5-6. Although the present disclosure may describe certain steps of process 400 (and of other processes described herein) as being implemented by certain components of the devices and systems of FIGS. 1A, 2A, 5-6, this is for purposes of illustration only, and it should be understood that other components of the devices and systems of FIGS. 1A, 2A, 5-6 may implement those steps instead.

At step 402, the system (e.g., system 100, server 104, user device 101, etc.) initiates capturing the moment in VR. For example, the initiating capturing the moment in VR may be capturing a view of a VR environment. In some embodiments, step 402 (and any of the steps of FIG. 4A) may be additionally or alternatively be performed by a control circuitry (e.g., control circuitry 611, control circuitry 618, or control circuitry of any of devices 607, 608, or 610). At step 404, the system records the current visual, spatial, and temporal data for both eyes. For example, the system may record a left eye view and a right eye view of a user device (e.g., stored in storage on a user device 101, storage 106, or any other suitable storage, etc.). At step 406, the system accesses video essence and metadata from a VR content database (e.g., storage 106, etc.). For example, the video essence and metadata may include additional representation of visual information in VR or 360-video. Additional representation of visual information in VR or 360-video may include:

(a) Data used to render the current left and right views
(b) Data used to render additional views that cover (100+x) % of current FoV, horizontally
(c) Data used to render additional views that cover (100+y) % of current FoV, vertically
(d) Data used to render additional views that cover Tb seconds before the instance of recording
(e) Data used to render additional views that cover T p seconds after the instance of recording
(f) Data used to render additional views that cover L degrees of camera movement towards left
(g) Data used to render additional views that cover R degrees of camera movement towards right The data from (a) may include different perspectives of an object of interest with varying occlusions. In some embodiments, the data from (a) may be used to generate an 3D image with detail in occluded areas. The data from (b) and (c) may enable spatial exploration as in changing viewports. The data from (d) and (e) may be used to represent an experience like "live photo," where the moments shortly before and after the capturing instance are included. The data from (f) and (g) may further prepare visual essence for the creation of 3D image to reveal realistic (e.g., credible and convincing) detail in occluded areas. The data of (f) and (g) may be rendered from different virtual cameras in various directions, adjacent to the current camera and may not be limited to moving the current camera around. The system may output representative data (accessed video essence and metadata) of the moment in VR. The output may be used in a process of converting VR data to 3D photos. In some embodiments, after step 406, input/output circuitry (e.g., input/output circuitry 612 of FIG. 6) connected to the control circuitry may output representative data of the moment in VR.

At step 408, the system estimates depth of objects from input images. The input images may be the output representative data (accessed video essence and metadata) of the moment in VR. Additional visual data may provide texture, color, and context information to reduce inaccuracy and inconsistency in depth estimation and inpainting. Improved depth values may help in rendering new views. At step 410, the system adjusts and refines depth of objects in input images. At step 412, the system synthesizes views from adjusted and refined depth of objects in input images. Consistent depth maps may enable geometrically consistent image inpainting and outpainting. Additional visual data as input may also be beneficial for synthesizing high quality views, and may establish a good foundation in extracting visual data from the input to improve rendering a novel view that is incomplete due to disocclusion. The output of step 412 may be a point cloud of synthesized views. At step 414, the system may generate a point cloud of synthesized views. In some embodiments, step 414 is optional.

Various types of visual artifacts may come from imperfect depth estimation. In some embodiments, when the representation of final point cloud can be constructed by the input collected from capturing the VR moment, depth estimation and view synthesis may be optional. A typical example is VR gaming, where the visual essence of texture, color, lighting, reflection, etc. may be rendered from different angles and positions at the moment of interest.

In some embodiments, parts of a high-quality point cloud may have additional synthesis from, e.g., 360-degree video captured with a number of cameras. The set of representative data, including video and metadata may improve the results in estimation and rendering of new views.

In some embodiments, modules in 3D creation may benefit from additional data than a few images. Additional data may enable depth estimation and refinement to generate accurate and consistent depth values, within and across objects in foreground and background. Improved depth estimation may enable improved or more efficient synthesizing of new views along a virtual camera path.

In some embodiments, having additional texture, color, context and depth information from capturing the VR moment may improve depth estimation and may improve synthesizing new views to complete the point cloud. Image inpainting and outpainting may benefit from the availability of credible detail in the input. For instance, the inclusion of (b) Data used to render additional views that cover (100+x) % of current FoV (field of view), horizontally and (c) Data used to render additional views that cover (100+y) % of current FoV, vertically may make outpainting more accurate and consistent, reducing distortions in the case of scrolling for an extended range beyond content that was captured (e.g., view presented on user device). Without use of additional information, the effect may appear to be repetitively filled structures and textures.

Figure 4B:
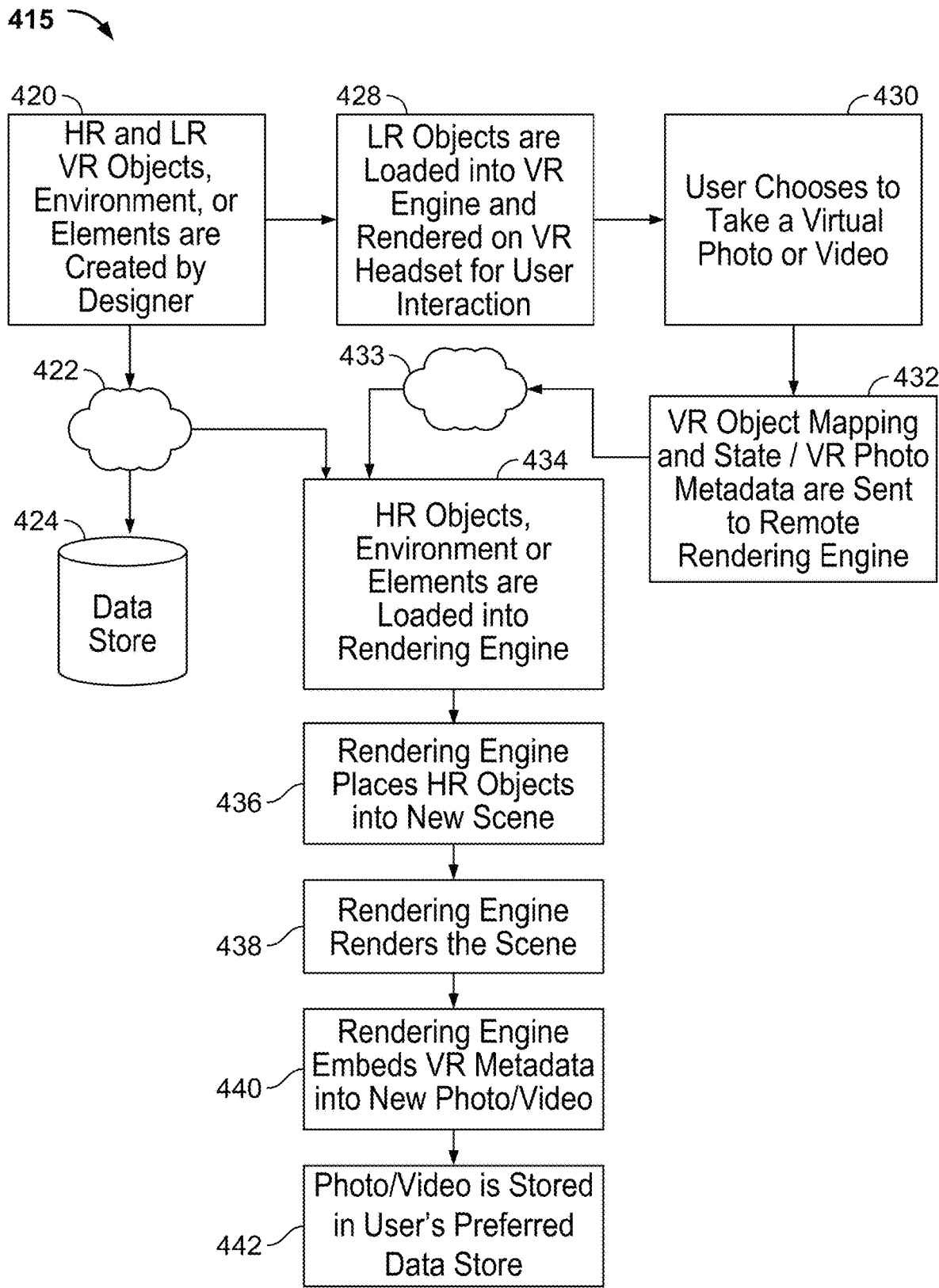
FIG. 4B is a flowchart of a detailed illustrative process of generating an image with HR objects and VR metadata, in accordance with some embodiments of this disclosure.

FIG. 4B is a flowchart of a detailed illustrative process of generating an image with HR objects and VR metadata, in accordance with some embodiments of this disclosure. The process may enable creating a high resolution virtual photo or video from low resolution VR objects using VR object mapping metadata to remotely render a new image based on but not limited to the VR object position, VR environment information such as virtual location data, VR environment lighting conditions. The process may enable storing the enhanced image or video within a user's third-party cloud storage account such as iCloud photos. Network APIs may allow authenticated users to upload documents such as photos to a datastore where they may be downloaded automatically to devices of users (e.g., mobile device).

In various embodiments, the individual steps of process 415 may be implemented by one or more components of the devices and systems of FIGS. 1A, 2A, 5-6. Although the present disclosure may describe certain steps of process 415 (and of other processes described herein) as being implemented by certain components of the devices and systems of FIGS. 1A, 2A, 5-6, this is for purposes of illustration only, and it should be understood that other components of the devices and systems of FIGS. 1A, 2A, 5-6 may implement those steps instead.

At step 420, the system (e.g., system 100, etc.) creates high resolution (HR) and low resolution (LR) VR objects, environment, or elements. In some embodiments, step 420 (and any of the other steps of FIG. 4B) may be additionally or alternatively be performed by a control circuitry (e.g., control circuitry 611, control circuitry 618, or control circuitry of any of devices 607, 608, or 610). For example, a designer creates high complexity/high resolution and low complexity/low resolution VR objects, environments or elements. In some embodiments, the designer may create the VR objects, environments, or elements on a user device (e.g., a personal computer, etc., or any other suitable user device 101 although not shown for simplicity in FIG. 1A)

connected to server 104 (e.g., via a network) in the system 100. The HR and LR elements (e.g., VR objects, environment, or elements) are stored in data store 424 (e.g., storage 106, etc.) via network 422. At step 428, the system (e.g., system 100, server 104, user device 101, etc.) loads LR objects into VR engine (e.g., VR engine associated with server 104, user device 101, or some combination thereof, etc.) and renders the LR objects on a VR headset (e.g., user device 101, etc.) for user interaction.

At step 430, the system (e.g., system 100, server 104, user device 101, etc.) receives an input indicating that a user chooses to take a virtual photo or video. For example, a user chooses to take a virtual photo or video by providing user input received by the system to indicate a command to take a virtual photo or video. In some embodiments, at step 430, input/output circuitry (e.g., input/output circuitry 612 of FIG. 6) connected to the control circuitry receives an input indicating that a user chooses to take a virtual photo or video. In some embodiments, although not shown in FIG. 4B for purposes of simplicity, the system (e.g., system 100, server 104, user device 101, etc.) may determine whether a photo or video has audio. If the photo or video has audio, the system may transfer audio to the remote rendering engine (e.g., rendering engine associated with server 104, etc.) via the network 433. If the photo or video does not have audio, the system may proceed to step 432.

At step 432, the system (e.g., system 100, server 104, user device 101, etc.) transmits VR object mapping and state, and VR photo metadata (e.g., from storage on user device 101, storage 106, etc.) to a remote rendering engine (e.g., rendering engine associated with server 104, etc.) via network 433. In some embodiments, step 432 may be additionally or alternatively be performed by input/output circuitry (e.g., input/output circuitry 612 of FIG. 6) connected to the control circuitry. In some embodiments network 433 is the same as network 422.

At step 434, the system loads HR objects, environments, or elements into rendering engine. At step 436, the system (e.g., rendering engine associated with server 104, etc.) places HR objects into the scene. For example, the rendering engine places HR objects into a new scene using VR object mapping and VR photo metadata. At step 438, the system (e.g., rendering engine associated with server 104, etc.) renders the scene. At step 440, the system (e.g., rendering engine associated with server 104, etc.) embeds VR metadata into new photo/video. For example, VR metadata such as but not limited to virtual photo or video indicator, date/time, and/or virtual metaverse GPS, is embedded into the newly created photo or video. At step 442, the system (e.g., system 100, server 104, etc.) stores photo/video in preferred data store (e.g., storage on a user device, cloud storage, etc., or any other suitable storage 106 although not shown for simplicity in FIG. 1A). For example, the newly created photo or video is stored in the user's preferred data store.

Figure 4C:
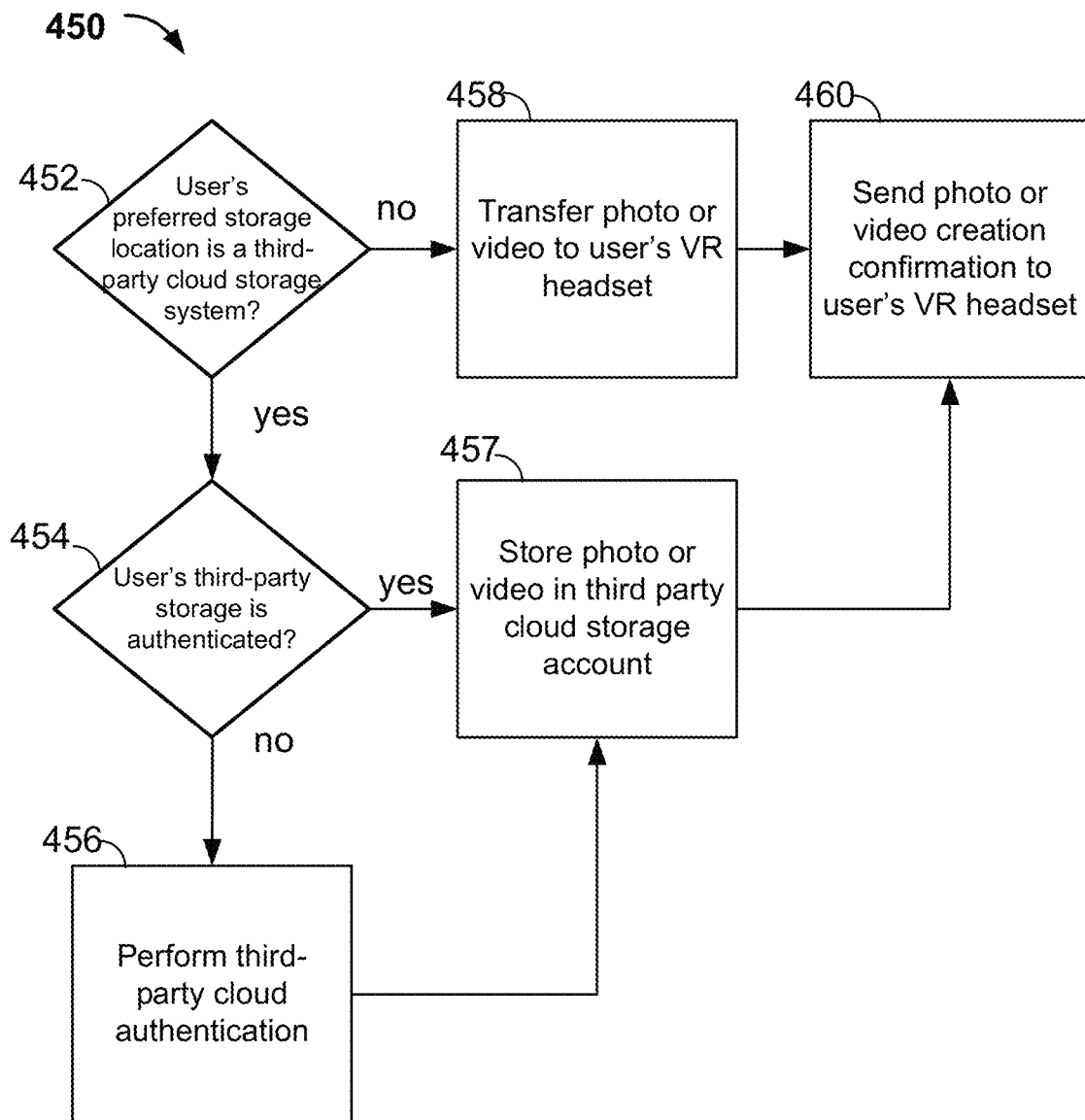
FIG. 4C is a flowchart of a detailed illustrative process of storing a photo or video in a preferred data store, in accordance with some embodiments of this disclosure.

FIG. 4C is a flowchart of a detailed illustrative process of storing a photo or video in a preferred data store, in accordance with some embodiments of this disclosure. In various embodiments, the individual steps of process 450 may be implemented by one or more components of the devices and systems of FIGS. 1A, 2A, 5-6. Although the present disclosure may describe certain steps of process 450 (and of other processes described herein) as being implemented by certain components of the devices and systems of FIGS. 1A, 2A, 5-6, this is for purposes of illustration only, and it should be understood that other components of the devices and systems of FIGS. 1A, 2A, 5-6 may implement those steps instead.

At step 452, the system (e.g., system 100, server 104, etc.) determines whether the user's preferred storage location is a third-party cloud storage system. In some embodiments, step 452 (and any of the other steps of FIG. 4C) may be additionally or alternatively be performed by a control circuitry (e.g., control circuitry 611, control circuitry 618, or control circuitry of any of devices 607, 608, or 610). If the user's preferred storage location is a third-party cloud storage system, the system proceeds to step 454. If the user's preferred storage location is not a third-party cloud storage system, the system proceeds to step 458. At step 458, the system transfers the photo or video to the user's VR headset (e.g., storage on user device 101). After step 458, the system proceeds to step 460. At step 460, the system (e.g., system 100, server 104, etc.) sends a photo or video creation confirmation to user's VR headset (e.g., user device 101). In some embodiments, step 458 and step 460 may be performed by input/output circuitry (e.g., input/output circuitry 612 of FIG. 6) connected to the control circuitry.

At step 454, the system (e.g., system 100, server 104, etc.) determines whether the user's third-party storage is authenticated. If the user's preferred storage is authenticated, the system proceeds to step 457. If the user's preferred storage location is not authenticated, the system proceeds to step 456. At step 456, the system (e.g., system 100, server 104, etc., or any other suitable server 104 although not shown for simplicity in FIG. 1A) performs third-party cloud authentication. After step 456, the system proceeds to step 457.

At step 457, the system stores the photo or video in a third party cloud storage account. After the systems stores the photo or video in a third party cloud storage account, the photo or video may appear in the user's cloud storage account. In one embodiment, the third party cloud storage account may be iCloud photos, and the photo or video may appear in a user's iCloud photos account. After step 457, the system proceeds to step 460. At step 460, the system sends photo or video creation confirmation to user's VR headset (e.g., user device 101). In some embodiments, step 457 may be performed by input/output circuitry (e.g., input/output circuitry 612 of FIG. 6) connected to the control circuitry.

Figure 5:
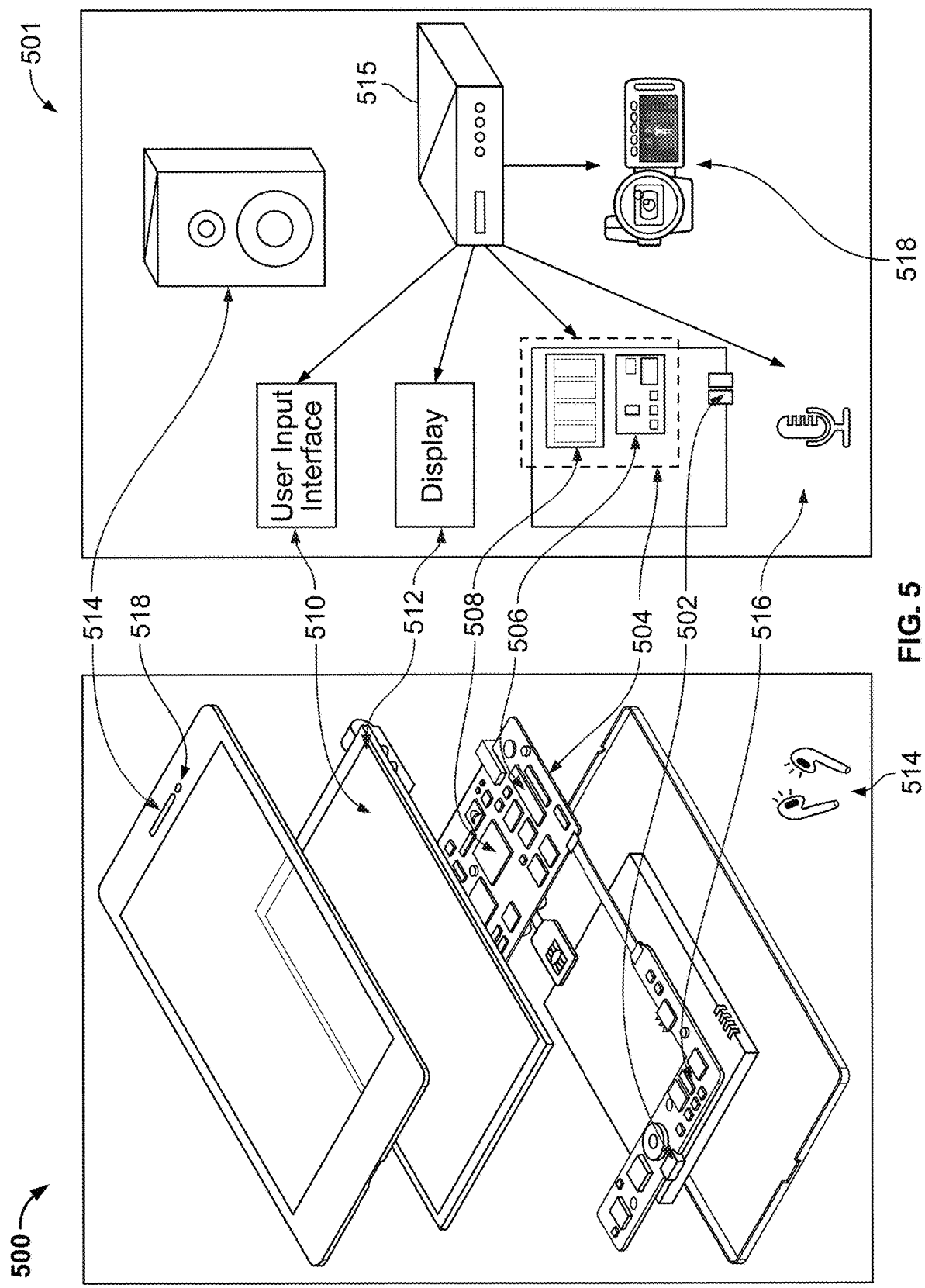
FIG. 5 shows an illustrative user equipment device, in accordance with some embodiments of this disclosure.
Figure 6:
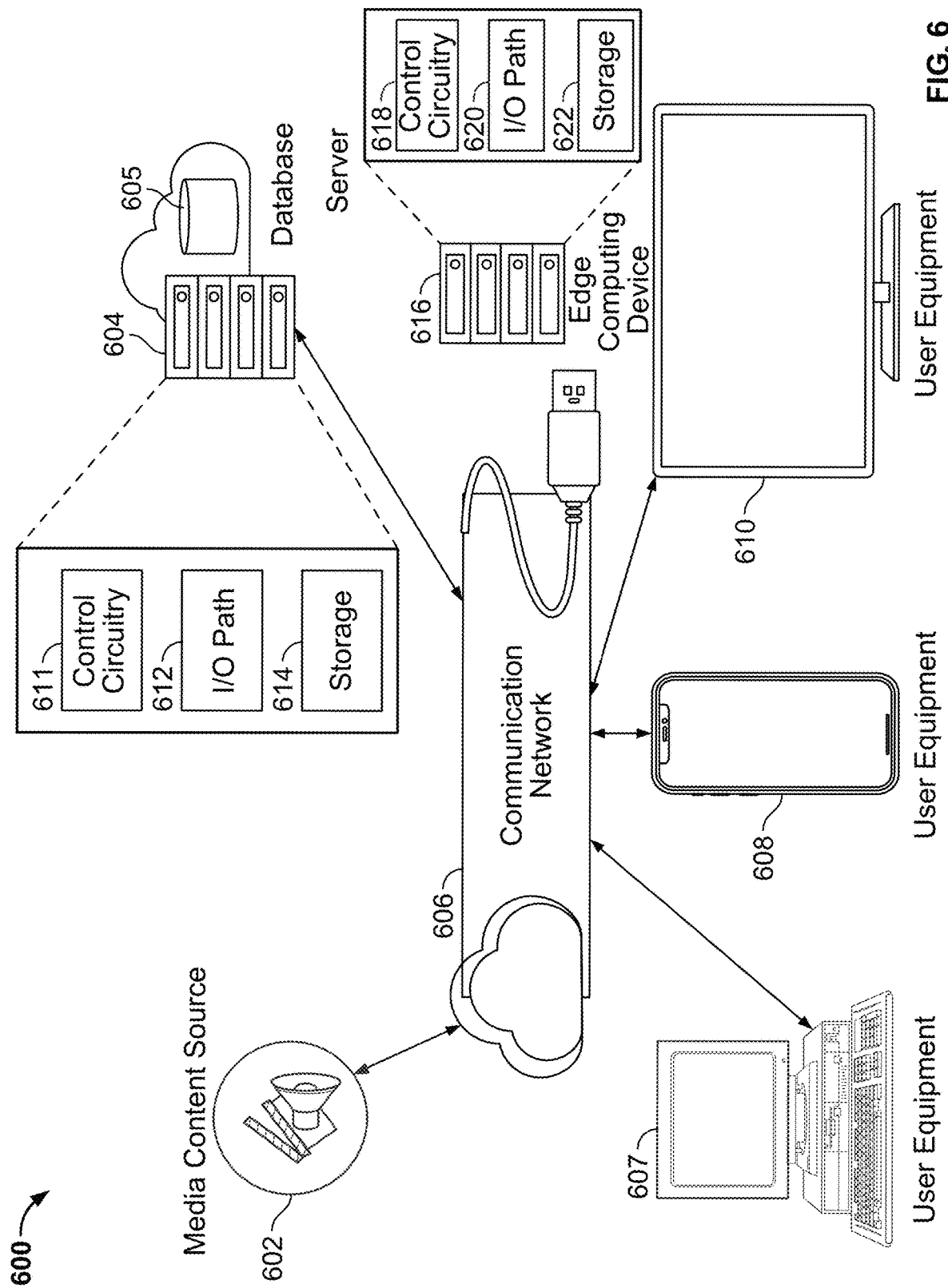
FIG. 6 shows an example system, in accordance with some embodiments of this disclosure.

FIGS. 5-6 depict illustrative devices, systems, servers, and related hardware for creating enhanced virtual reality content and automatically storing images of the virtual 3D environment. FIGS. 5 and 6 show generalized embodiments of illustrative user equipment devices 500 501, 607, 608, and 610, any one of which may represent an example of either of the devices 101 or 201 shown in FIGS. 1A and 2A. The server 604 shown in FIG. 6 may represent an example of servers 104 or 204 shown in FIGS. 1A and 2A in some embodiments.

For example, user equipment device 500 may be a smartphone device, a tablet, a VR device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display or a computer display. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/output (I/O) path (e.g., circuitry) 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the VR application stored in memory (e.g., storage 508). Specifically, control circuitry 504 may be instructed by the VR application to perform the functions discussed above and below. For example, the VR application may include logic or instructions to render an VR environment. For example, the VR application may include logic or instructions for creating enhanced virtual reality content. For example, the VR application may include logic or instructions for automatically storing images of the virtual 3D environment (e.g., automatically capturing virtual reality content). In some implementations, processing or actions performed by control circuitry 504 may be based on instructions received from the VR application.

In client/server-based embodiments, control circuitry 504 may include communications circuitry suitable for communicating with a server or other networks or servers. The VR application may be a stand-alone application implemented on a device or a server. The VR application may be implemented as software or a set of executable instructions. The instructions for performing any of the embodiments discussed herein of the VR application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the VR application may be a client/server application where only the client application resides on device 500, and a server application resides on an external server (e.g., server 604 and/or server 616). For example, the VR application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing creating enhanced virtual reality content and automatically storing images of the virtual 3D environment capabilities, providing storage (e.g., for a database) or parsing data (e.g., using machine learning algorithms) are provided by a collection of network-accessible computing and storage resources (e.g., server 604 and/or edge computing device 616), referred to as "the cloud." Device 500 may be a cloud client that relies on the cloud computing capabilities from server 604 to determine whether processing (e.g., at least a portion of virtual background processing and/or at least a portion of other processing tasks) should be offloaded from the mobile device, and facilitate such offloading. When executed by control circuitry of server 604 or 616, the VR application may instruct control circuitry 611 or 618 to perform processing tasks for the client device and facilitate the creating enhanced virtual reality content and automatically storing images of the virtual 3D environment.

Control circuitry 504 may include communications circuitry suitable for communicating with a server, edge computing systems and devices, a table or database server, or other networks or servers. The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as VR application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video data for creating enhanced virtual reality content and automatically storing images of the virtual 3D environment. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The VR application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide creating enhanced virtual reality content and automatically storing images of the virtual 3D environment and perform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the VR application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the VR application may be downloaded and interpreted or otherwise run by an interpreter or virtual machine (run by control circuitry 504). In some embodiments, the VR application may be encoded in the ETV Binary Interchange Format (EBIF), received by control circuitry 504 as part of a suitable feed, and interpreted by a user agent running on control circuitry 504. For example, the VR application may be an EBIF application. In some embodiments, the VR application may be defined by a series of JAVA-based files that are received and run by a local virtual machine or other suitable middleware executed by control circuitry 504. In some of such embodiments (e.g., those employing MPEG-2 or other digital media encoding schemes), VR application may be, for example, encoded and transmitted in an MPEG-2 object carousel with the MPEG audio and video packets of a program.

FIG. 6 is a diagram of an illustrative system 600 for creating enhanced virtual reality content, in accordance with some embodiments of this disclosure. User equipment devices 607, 608, 610 (e.g., which may correspond to one or more of computing device 212 may be coupled to communication network 606). Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more servers 604, and one or more edge computing devices 616 (e.g., included as part of an edge computing system). In some embodiments, the VR application may be executed at one or more of control circuitry 611 of server 604 (and/or control circuitry of user equipment devices 607, 608, 610 and/or control circuitry 618 of edge computing device 616). In some embodiments, data may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide data for creating enhanced virtual reality content, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620, and storage 622, which may be implemented in a similar manner as control circuitry 611, I/O path 612, and storage 624, respectively of server 604. Edge computing device 616 may be configured to be in communication with one or more of user equipment devices 607, 608, 610 and video server 604 over communication network 606, and may be configured to perform processing tasks (e.g., for creating enhanced virtual reality content and automatically storing images of the virtual 3D environment) in connection with ongoing processing of video data. In some embodiments, a plurality of edge computing devices 616 may be strategically located at various geographic locations, and may be mobile edge computing devices configured to provide processing support for mobile devices at various geographical regions.

Figure 7:
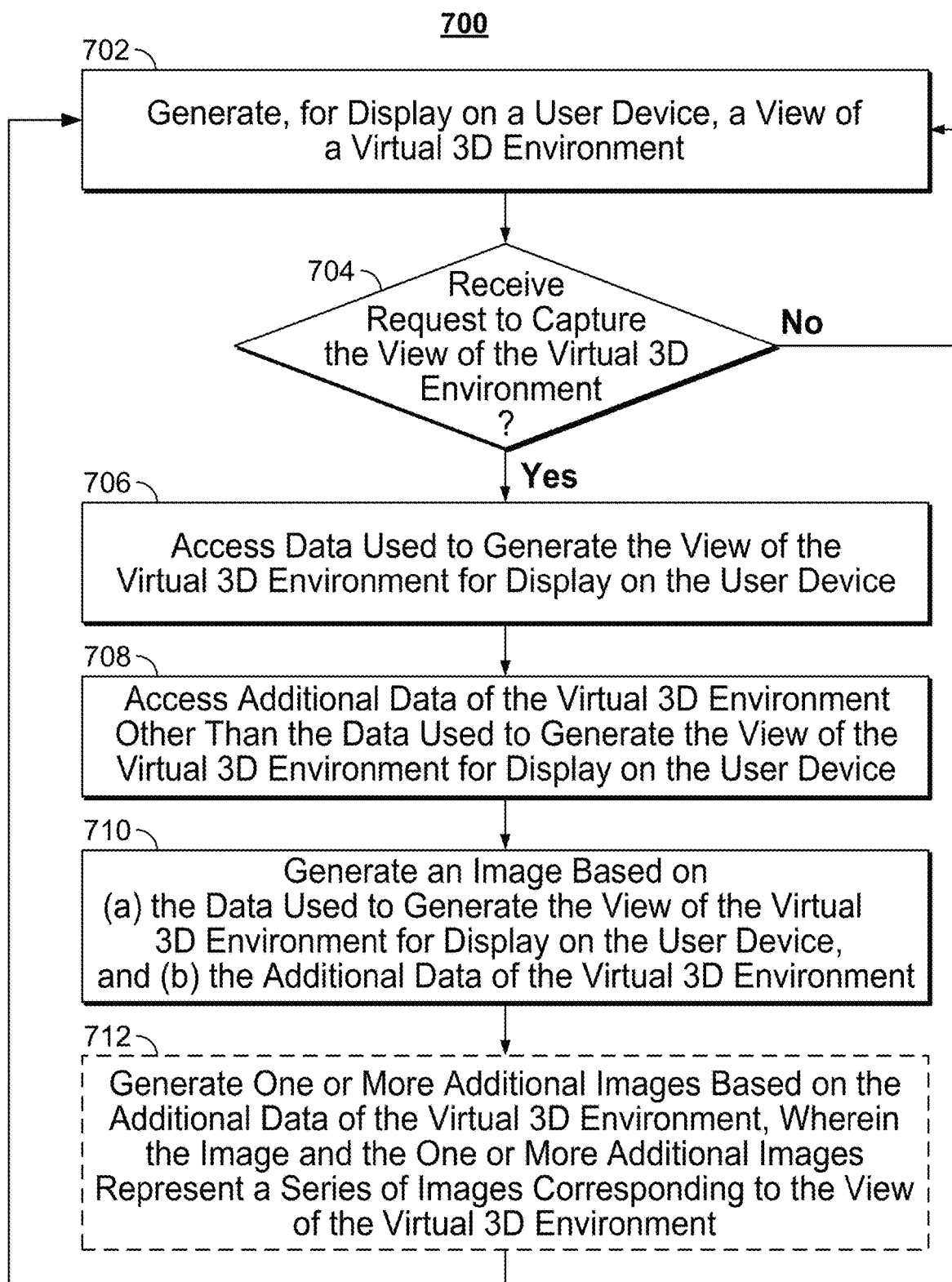
FIG. 7 is a flowchart of a detailed illustrative process for generating images, in accordance with some embodiments of this disclosure.

FIG. 7 is a flowchart of a detailed illustrative process for generating images, in accordance with some embodiments of this disclosure.

In various embodiments, the individual steps of process 700 may be implemented by one or more components of the devices and systems of FIGS. 1A, 2A, 5-6. Although the present disclosure may describe certain steps of process 700 (and of other processes described herein) as being implemented by certain components of the devices and systems of FIGS. 1A, 2A, 5-6, this is for purposes of illustration only, and it should be understood that other components of the devices and systems of FIGS. 1A, 2A, 5-6 may implement those steps instead.

At step 702, control circuitry (e.g., control circuitry 611, control circuitry 618, or control circuitry of any of devices 607, 608, or 610) generates, for display on a user device, a view of a virtual 3D environment. In some embodiments, generating for display on a user device may mean transmitting rendered data by the server. For example, input/output circuitry (e.g., input/output circuitry 612 of FIG. 6) connected to the control circuitry may generate, for display on a user device, a view of a virtual 3D environment.

At step 704, the control circuitry determines if it receives a request to capture the view of the virtual 3D environment. For example, input/output circuitry (e.g., input/output circuitry 612 of FIG. 6) connected to the control circuitry may receive a request from the user device to capture the view of the virtual 3D environment. If the control circuitry determines it received a request to capture the view of the virtual 3D environment, the control circuitry proceeds to step 706. If the control circuitry determines it did not receive a request to capture the view of the virtual 3D environment, the control circuitry proceeds to step 702.

At step 706, control circuitry accesses data used to generate the view of the virtual 3D environment for display on the user device.

At step 708, control circuitry accesses additional data of the virtual 3D environment other than the data used to generate the view of the virtual 3D environment for display on the user device. In some embodiments, the additional data may include depth data for the view of the virtual 3D environment.

At step 710, control circuitry generates an image based on (a) the data used to generate the view of the virtual 3D environment for display on the user device, and (b) the additional data of the virtual 3D environment. The image may be generated for display for the user device. The image may be generated for display for another device (e.g., not the device requesting capturing the view). The image may be generated on the user device (e.g., control circuitry of any device 607, 608, 610), on a server or cloud (e.g., control circuitry 611, control circuitry 618 of server 604 and/or edge computing device 616), or any combination thereof. The image may be an interactive image configured to display different view angles of the virtual 3D environment based on user interface input from the user device. The user interface input may include one or more of: tilting, rotating, or scrolling. In some embodiments, the image may include at least a portion of an object of the 3D environment that is not included in the view of the virtual 3D environment. The image may represent the view of the virtual 3D environment captured at a different time than a time the request was received. For example, the image may be captured before or after a time t at which the request was received. In some embodiments, there may be multiple images captured before and/or after a time t at which the request was received. In some embodiments, the multiple images may represent a virtual live photo of images captured before and/or after a time t at which the request was received. The image may represent the view of the virtual 3D environment including an application of a filter not shown in the view of the virtual 3D environment. The application of the filter may include one or more of: adding or removing a virtual flash, removing or adding a lens flare, or changing a focal length or aperture of a virtual camera. In some embodiments, at least a portion of the image may be represented at a higher resolution than a corresponding portion of the view of the virtual 3D environment.

At step 712, control circuitry generates one or more additional images based on the additional data of the virtual 3D environment. After step 712, control circuitry proceeds to step 702. The one or more additional images may be generated on the user device (e.g., control circuitry of any device 607, 608, 610), on a server or cloud (e.g., control circuitry 611, control circuitry 618 of server 604 and/or edge computing device 616), or any combination thereof. The image and the one or more additional images may represent a series of images corresponding to the view of the virtual 3D environment. In some embodiments, the system may create an album including the image and the one or more additional images. The album may be created to include the image and/or the one or more additional images. In some embodiments, the image is added to an existing album. In some embodiments, the image may be added to an album according to the type of image and the type of album. For example, the image may be a selfie image and may be added to a selfie album. In some embodiments, the image may be added to an album according to the VR environment the image was taken in. Different VR environments may be associated with different albums. For example, there may be a Paris VR environment or a beach VR environment. An image may be taken in a Paris VR environment (e.g., image with Eiffel Tower) and may be added to an album associated with a Paris VR environment. An image may be taken in a beach VR environment and may be added to an album associated with a beach VR environment. In some embodiments, the system may store the image to a social feed for a user ID associated with the user device. For example, a social feed may be on FACEBOOK. In some embodiments, the system may generate, for display on the user device, a recommendation to suggest a positioning of an avatar associated with a user ID associated with the user device in the virtual 3D environment for capturing a popular image of the avatar in the virtual 3D environment for a virtual selfie. The avatar may be a photorealistic rendering of a user associated with the user device. In some embodiments, the system generates one or more additional images based on the additional data of the virtual 3D environment, wherein the image represents the view of the virtual 3D environment captured at a same time that the time the request was received, and the one or more additional images represents the view of the virtual 3D environment captured at one or more different times than the time the request was received, and the image and the one or more additional images represents a virtual live photo. In some embodiments, step 712 may be optional, and after step 710, control circuitry may proceed to step 702.

Figure 8:
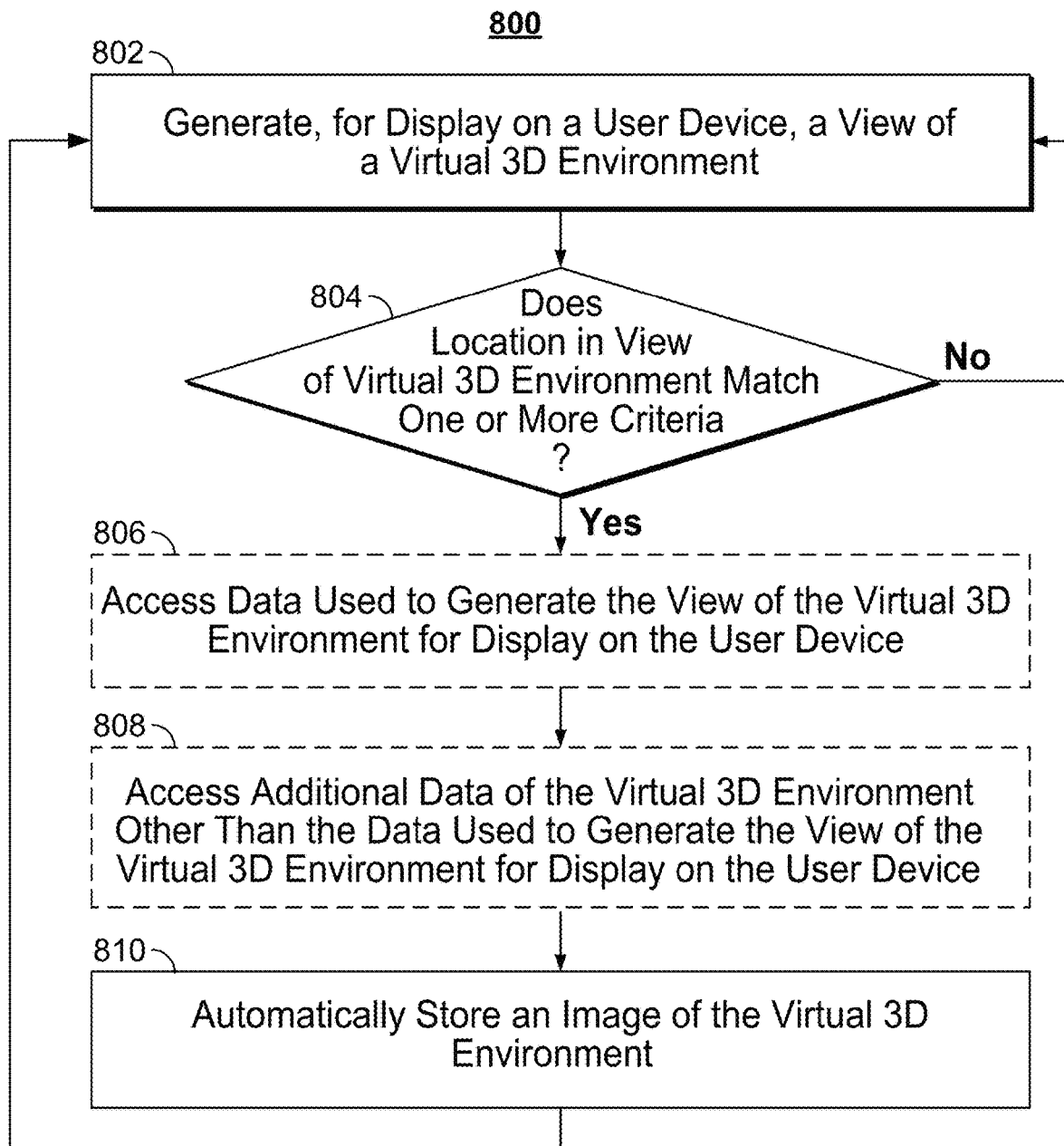
FIG. 8 is a flowchart of a detailed illustrative process for automatically storing images of the virtual 3D environment, in accordance with some embodiments of this disclosure.

FIG. 8 is a flowchart of a detailed illustrative process for automatically storing images of the virtual 3D environment, in accordance with some embodiments of this disclosure.

In various embodiments, the individual steps of process 800 may be implemented by one or more components of the devices and systems of FIGS. 1A, 2A, 5-6. Although the present disclosure may describe certain steps of process 800 (and of other processes described herein) as being implemented by certain components of the devices and systems of FIGS. 1A, 2A, 5-6, this is for purposes of illustration only, and it should be understood that other components of the devices and systems of FIGS. 1A, 2A, 5-6 may implement those steps instead.

At step 802, control circuitry (e.g., control circuitry 611, control circuitry 618, or control circuitry of any of devices

607, 608, or 610) generates, for display on a user device, a view of a virtual 3D environment. In some embodiments, generating for display on a user device may mean transmitting rendered data by the server. For example, input/output circuitry (e.g., input/output circuitry 612 of FIG. 6) connected to the control circuitry may generate, for display on a user device, a view of a virtual 3D environment.

At step 804, control circuitry detects whether a location in the view of the virtual 3D environment matches one or more criteria. In some embodiments, if the control circuitry detects that a location in the view of the virtual 3D environment matches the one or more criteria, the control circuitry proceeds to step 806. In some embodiments, steps 806 and 808 are optional, and if the control circuitry detects that a location in the view of the virtual 3D environment matches the one or more criteria, the control circuitry proceeds to step 810. If the control circuitry detects that a location in the view of the virtual 3D environment does not match the one or more criteria, the control circuitry proceeds to step 802.

In some embodiments, detecting that the location in the virtual 3D environment matches the one or more criteria comprises determining that a number of images captured by other user IDs at the location in the virtual 3D environment exceeds a threshold number. In some embodiments, detecting that the location in the virtual 3D environment matches the one or more criteria comprises determining that a number of images captured by other device IDs at the location in the virtual 3D environment exceeds a threshold number. The number of images captured by other user IDs and/or device IDs may be a sum of the images captured by other user IDs and/or device IDs. In some embodiments, the number of images captured by other user IDs and/or device IDs may be a weighted sum of the images captured by other user IDs and/or device IDs. For example, a user may be associated with multiple devices (e.g., device IDs) and/or with different user IDs, and instead of counting each image captured by different device ID and/or user IDs associated with the same user, the system may weight the number of images captured by the device IDs and/or user IDs by a same user (e.g., weighting may be less than one) for use in a weighted sum of the images captured by other device IDs and/or user IDs.

In some embodiments, detecting that the location in the virtual 3D environment matches the one or more criteria comprises determining that the location represents a pathway to or a popular object included in a new environment for a user ID associated with the user device. In some embodiments, detecting that the location in the virtual 3D environment matches the one or more criteria comprises determining that a user preference indicates to automatically capture an image in a location where one or more friends captured one or more images; and determining that the one or more friends captured the one or more images at the location in the virtual 3D environment. In some embodiments, detecting that the location in the virtual 3D environment matches the one or more criteria comprises determining that a number of captured images including an object present in the location by other user IDs in the virtual 3D environment exceeds a threshold number.

In some embodiments, the detecting that the location in the virtual 3D environment matches the one or more criteria comprises determining that a number of captured images including an object present in the location by other device IDs in the virtual 3D environment exceeds a threshold number. The number of captured images by other user IDs and/or device IDs may be a sum of the captured images by other user IDs and/or device IDs. In some embodiments, the number of captured images by other user IDs and/or device IDs may be a weighted sum of the captured images by other user IDs and/or device IDs. For example, a user may be associated with multiple devices (e.g., device IDs) and/or with different user IDs, and instead of counting each captured image by different device ID and/or user IDs associated with the same user, the system may weight the number of captured images by the device IDs and/or user IDs by a same user (e.g., weighting may be less than one) for use in a weighted sum of the captured images by other device IDs and/or user IDs. In some embodiments, detecting that the location in the virtual 3D environment matches the one or more criteria comprises determining that a number of images captured by other device IDs at the location in the virtual 3D environment exceeds a threshold number. The number of images captured by other user IDs and/or device IDs may be a sum of the images captured by other user IDs and/or device IDs. In some embodiments, the number of images captured by other user IDs and/or device IDs may be a weighted sum of the images captured by other user IDs and/or device IDs. For example, a user may be associated with multiple devices (e.g., device IDs) and/or with different user IDs, and instead of counting each image captured by different device ID and/or user IDs associated with the same user, the system may weight the number of images captured by the different device IDs and/or user IDs by a same user (e.g., weighting may be less than one) for use in a weighted sum of the images captured by other device IDs and/or user IDs.

At step 806, control circuitry accesses data used to generate the view of the virtual 3D environment for display on the user device. In some embodiments, control circuitry generates the image based on the data used to generate the view of the virtual 3D environment for display on the user device. In some embodiments, step 806 is optional.

At step 808, control circuitry accesses additional data of the virtual 3D environment other than the data used to generate the view of the virtual 3D environment for display on the user device. In some embodiments, the control circuitry generates the image based on (a) the data used to generate the view of the virtual 3D environment for display on the user device and (b) the additional data of the virtual 3D environment. In some embodiments, step 808 is optional.

At step 810, control circuitry automatically stores an image of the virtual 3D environment. In some embodiments, the system may access data used to generate the view of the virtual 3D environment for display on the user device, and the system may access additional data of the virtual 3D environment other than the data used to generate the view of the virtual 3D environment for display on the user device. The system may generate the image based on (a) the data used to generate the view of the virtual 3D environment for display on the user device, and (b) the additional data of the virtual 3D environment. For example, in response to the detecting that the location in the virtual 3D environment matches the one or more criteria, the system may automatically store an image (e.g., enhanced image) representing a view of the virtual 3D environment (e.g., generated image based on (a) and (b)). After step 810, the control circuitry proceeds to step 802.

In some embodiments, step 808 is optional, and after step 806, the control circuitry proceeds to step 810. In some embodiments, the system may access data used to generate the view of the virtual 3D environment for display on the user device. The system may generate the image based on the data used to generate the view of the virtual 3D environment for display on the user device. For example, in response to detecting that the location in the virtual 3D environment matches the one or more criteria, the system may automatically store an image representing the view of the virtual 3D environment for display on the user device.

In some embodiments, steps 806 and 808 are optional, and at step 804, if the control circuitry detects that a location in the view of the virtual 3D environment matches the one or more criteria, the control circuitry proceeds to step 810. For example, in response to detecting that the location in the virtual 3D environment matches the one or more criteria, the system may automatically store an image representing the view of the virtual 3D environment for display on the user device.

In some embodiments, step 808 may take place after step 810. For example, after automatically storing an image representing the view of the virtual 3D environment for display on the user device, the system may access additional data to give the user an option to enhance the stored image.

In some embodiments, the additional data includes depth data for the view of the virtual 3D environment, and the image is an interactive image configured to display different view angles of the virtual 3D environment based on user interface input from the user device, wherein the user interface input comprises one or more of tilting, rotating, or scrolling. In some embodiments, the image represents the view of the virtual 3D environment including an application of a filter not shown in the view of the virtual 3D environment, wherein the application of the filter comprises one or more of: adding or removing a virtual flash, removing or adding a lens flare, or changing a focal length or aperture of a virtual camera. In some embodiments, the image includes an avatar associated with a user ID associated with the user device positioned in a popular pose in the virtual 3D environment.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating, for display on a user device, a view of an interactive virtual 3D environment;
   adjusting the view of the interactive virtual 3D environment based on user interface inputs;
   detecting that a location in the adjusted view of the interactive virtual 3D environment matches one or more criteria; and
   in response to the detecting that the location in the adjusted view of the interactive virtual 3D environment matches the one or more criteria, automatically storing a 2D image of the interactive virtual 3D environment, wherein the 2D image is based on the adjusted view of the interactive virtual 3D environment.

2. The method of claim 1, further comprising:
   accessing data used to generate the view of the interactive virtual 3D environment for display on the user device; and
   generating the 2D image based on the data used to generate the view of the interactive virtual 3D environment for display on the user device.

3. The method of claim 1, wherein the detecting that the location in the interactive virtual 3D environment matches the one or more criteria comprises:
   determining that a number of images captured by other user IDs at the location in the interactive virtual 3D environment exceeds a threshold number.

4. The method of claim 1, wherein detecting that the location in the interactive virtual 3D environment matches the one or more criteria comprises:
   determining that the location represents a popular object included in a new environment for a user ID associated with the user device or a pathway to the popular object included in the new environment for the user ID associated with the user device.

5. The method of claim 1, wherein detecting that the location in the interactive virtual 3D environment matches the one or more criteria comprises:
   determining that a user preference indicates to automatically capture a 2D image in a location where one or more friends captured one or more images; and
   determining that the one or more friends captured the one or more images at the location in the interactive virtual 3D environment.

6. The method of claim 1, wherein the detecting that the location in the interactive virtual 3D environment matches the one or more criteria comprises:
   determining that a number of captured images including an object present in the location by other user IDs in the interactive virtual 3D environment exceeds a threshold number.

7. The method of claim 1, further comprising:
   accessing data used to generate the view of the interactive virtual 3D environment for display on the user device;
   accessing additional data of the interactive virtual 3D environment other than the data used to generate the view of the interactive virtual 3D environment for display on the user device; and
   generating the 2D image based on (a) the data used to generate the view of the interactive virtual 3D environment for display on the user device, and (b) the additional data of the interactive virtual 3D environment.

8. The method of claim 7, wherein the additional data includes depth data for the view of the interactive virtual 3D environment, and the 2D image is an interactive image configured to display different view angles of the interactive virtual 3D environment based on the user interface inputs from the user device, wherein the user interface inputs comprise one or more of tilting, rotating, or scrolling.

9. The method of claim 7, wherein the 2D image represents the view of the interactive virtual 3D environment including an application of a filter not shown in the view of the interactive virtual 3D environment, wherein the application of the filter comprises one or more of: adding or removing a virtual flash, removing or adding a lens flare, or changing a focal length or aperture of a virtual camera.

10. The method of claim 7, wherein the 2D image includes an avatar associated with a user ID associated with the user device, wherein the avatar is positioned in a popular pose in the interactive virtual 3D environment.

11. The method of claim 1, wherein the 2D image of the interactive virtual 3D environment is stored without receiving a further user interface input requesting the storing of the 2D image.

12. A system comprising:
input/output control circuitry configured to:
generate, for display on a user device, a view of an interactive virtual 3D environment; and
control circuitry configured to:
adjust the view of the interactive virtual 3D environment based on user interface inputs;
detect that a location in the adjusted view of the interactive virtual 3D environment matches one or more criteria; and
in response to the detecting that the location in the adjusted view of the interactive virtual 3D environment matches the one or more criteria, automatically store a 2D image of the interactive virtual 3D environment, wherein the 2D image is based on the adjusted view of the interactive virtual 3D environment.

13. The system of claim 12, wherein the control circuitry is further configured to:
access data used to generate the view of the interactive virtual 3D environment for display on the user device; and
generate the 2D image based on the data used to generate the view of the interactive virtual 3D environment for display on the user device.

14. The system of claim 12, wherein the control circuitry configured to detect that the location in the interactive virtual 3D environment matches the one or more criteria is configured to:
determine that a number of images captured by other user IDs at the location in the interactive virtual 3D environment exceeds a threshold number.

15. The system of claim 12, wherein the control circuitry configured to detect that the location in the interactive virtual 3D environment matches the one or more criteria is configured to:
determine that the location represents a popular object included in a new environment for a user ID associated with the user device or a pathway to the popular object included in the new environment for the user ID associated with the user device.

16. The system of claim 12, wherein the control circuitry configured to detect that the location in the interactive virtual 3D environment matches the one or more criteria is configured to:
determine that a user preference indicates to automatically capture a 2D image in a location where one or more friends captured one or more images; and
determine that the one or more friends captured the one or more images at the location in the interactive virtual 3D environment.

17. The system of claim 12, wherein the control circuitry configured to detect that the location in the interactive virtual 3D environment matches the one or more criteria is configured to:
determine that a number of captured images including an object present in the location by other user IDs in the interactive virtual 3D environment exceeds a threshold number.

18. The system of claim 12, wherein the control circuitry is further configured to:
access data used to generate the view of the interactive virtual 3D environment for display on the user device;
access additional data of the interactive virtual 3D environment other than the data used to generate the view of the interactive virtual 3D environment for display on the user device; and
generate the 2D image based on (a) the data used to generate the view of the interactive virtual 3D environment for display on the user device, and (b) the additional data of the interactive virtual 3D environment.

19. The system of claim 18, wherein the additional data includes depth data for the view of the interactive virtual 3D environment, and the 2D image is an interactive image configured to display different view angles of the interactive virtual 3D environment based on user interface inputs from the user device, wherein the user interface inputs comprise one or more of tilting, rotating, or scrolling.

20. The system of claim 18, wherein the 2D image represents the view of the interactive virtual 3D environment including an application of a filter not shown in the view of the interactive virtual 3D environment, wherein the application of the filter comprises one or more of: adding or removing a virtual flash, removing or adding a lens flare, or changing a focal length or aperture of a virtual camera.

* * * * *